US011825033B2

United States Patent
Park et al.

(10) Patent No.: US 11,825,033 B2
(45) Date of Patent: Nov. 21, 2023

(54) APPARATUS AND METHOD WITH ARTIFICIAL INTELLIGENCE FOR SCALING IMAGE DATA

(71) Applicant: SAMSUNG ELECTRONICS CO., LTD., Suwon-si (KR)

(72) Inventors: Taejun Park, Suwon-si (KR); Sangjo Lee, Suwon-si (KR); Sangkwon Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/496,507

(22) Filed: Oct. 7, 2021

(65) Prior Publication Data

US 2022/0030291 A1 Jan. 27, 2022

Related U.S. Application Data

(63) Continuation of application No. 16/535,784, filed on Aug. 8, 2019, now Pat. No. 11,388,465.

(30) Foreign Application Priority Data

Aug. 10, 2018 (KR) .................. 10-2018-0093511

(51) Int. Cl.
*H04N 21/2662* (2011.01)
*H04N 19/115* (2014.01)
(Continued)

(52) U.S. Cl.
CPC ....... *H04N 21/2662* (2013.01); *G06T 3/4007* (2013.01); *H04N 19/115* (2014.11);
(Continued)

(58) Field of Classification Search
CPC ............. H04N 21/2662; H04N 19/115; H04N 19/117; H04N 19/157; H04N 19/439;
(Continued)

(56) References Cited

U.S. PATENT DOCUMENTS 5,134,396 A 7/1992 Sirat et al.
7,956,930 B2 6/2011 Sullivan
(Continued)

FOREIGN PATENT DOCUMENTS

CN 107194347 A 9/2017
CN 108305214 A 7/2018
(Continued)

OTHER PUBLICATIONS

Communication issued by the European Patent Office dated May 10, 2022 in EP Application No. 19762283.0.
(Continued)

*Primary Examiner* — Richard T Torrente
(74) *Attorney, Agent, or Firm* — Sughrue Mion, PLLC

(57) ABSTRACT

The disclosure relates to an artificial intelligence (AI) system that uses a machine learning algorithm and an application thereof. A method for controlling an electronic apparatus according to the disclosure includes receiving image data and information associated with a filter set that is applied to an artificial intelligence model for upscaling the image data from an external server; decoding the image data; upscaling the decoded image data using a first artificial intelligence model that is obtained based on the information associated with the filter set; and providing the upscaled image data for output.

12 Claims, 17 Drawing Sheets

(51) Int. Cl.
| | |
|---|---|
| *H04N 19/117* | (2014.01) |
| *H04N 19/157* | (2014.01) |
| *H04N 19/42* | (2014.01) |
| *H04N 19/82* | (2014.01) |
| *G06T 3/40* | (2006.01) |

(52) U.S. Cl.
CPC ......... *H04N 19/117* (2014.11); *H04N 19/157* (2014.11); *H04N 19/439* (2014.11); *H04N 19/82* (2014.11)

(58) Field of Classification Search
CPC ........ H04N 19/82; H04N 19/33; H04N 19/59; H04N 19/46; H04N 19/154; H04N 19/172; H04N 21/440263; H04N 21/234363; H04N 21/440218; H04N 21/234309; H04N 7/0117; G06T 3/4007; G06T 3/4046; G06N 3/0454
See application file for complete search history.

(56) References Cited

U.S. PATENT DOCUMENTS

| | | | |
|---|---|---|---|
| 9,491,479 | B2 | 11/2016 | Zhao |
| 10,009,622 | B1* | 6/2018 | Mukherjee ............. H04N 19/59 |
| 2005/0091524 | A1 | 4/2005 | Abe |
| 2009/0034622 | A1* | 2/2009 | Huchet ................ H04N 19/182 |
| | | | 375/E7.193 |
| 2013/0129240 | A1 | 5/2013 | Shima |
| 2014/0010294 | A1 | 1/2014 | Ye et al. |
| 2018/0183998 | A1 | 6/2018 | Menachem et al. |
| 2018/0184102 | A1 | 6/2018 | Navarrete Michelini et al. |
| 2019/0124348 | A1* | 4/2019 | Yang ...................... H04N 19/51 |
| 2019/0347541 | A1* | 11/2019 | Li .......................... G06N 3/048 |
| 2020/0228820 | A1* | 7/2020 | Joshi ................... H04N 19/619 |

FOREIGN PATENT DOCUMENTS

| | | |
|---|---|---|
| JP | 6197227 A | 7/1994 |
| KR | 10-2018-0007239 A | 1/2018 |
| KR | 10-2018-0050832 A | 5/2018 |
| TW | 200611573 A | 4/2006 |
| WO | 2016/132145 A1 | 8/2016 |
| WO | 2018112514 A1 | 6/2018 |
| WO | 2018/120082 A1 | 7/2018 |

OTHER PUBLICATIONS

Communication issued by the European Patent Office dated May 13, 2022 in EP Application No. 19762283.0.
Communication issued by the European Patent Office dated Apr. 13, 2022 in EP Application No. 19762283.0.
Communication dated Mar. 31, 2022 issued by the Chinese Patent Office in CN Application No. 201910738429.3.
"Artificial Intelligence—Wikipedia", Aug. 9, 2018, XP055908725, pp. 1-71, https://en.wikipedia.org/w/index.php?title=Artificial_intelligence&oldid=854123634.
Communication dated Apr. 25, 2021, from the China National Intellectual Property Administration in Application No. 201910738429.3.
Communication dated Feb. 1, 2019, issued by the Korean Intellectual Property Office in corresponding Korean Application No. 10-2018-0093511.
Communication dated Jan. 10, 2020, from the European Patent Office in counterpart European Application No. 19762283.0.
Communication dated Jul. 17, 2020 issued by the State Intellectual Property Office of P.R. China in counterpart Chinese Application No. 201910738429.3.
Communication dated Mar. 27, 2021, from the Intellectual Property Office of India in Application No. 201947042000.
Communication dated Sep. 9, 2020 issued by the European Intellectual Property Office in counterpart European Application No. 19 762 283.0.
International Search Report (PCT/ISA/210), issued by International Searching Authority in corresponding International Application No. PCT/KR2019/010034, dated Nov. 18, 2019.
Office Action dated Jan. 8, 2021 by the China National Intellectual Property Administration in corresponding Chinese Application No. 201910738429.3.
Written Opinion (PCT/ISA/237) issued by the International Searching Authority in corresponding International Application No. PCT/KR2019/010034, dated Nov. 18, 2019.
Yongwoo Kim et al. "A Real-Time Convolutional Neural Networks for Super-Resolution on FPGA with Applications to 4K UHD 60 fps Video Services" IEEE Transactions on Circuits and Systems for Video Technology, 2018, (pp. 1-14).
Communication dated Sep. 17, 2021, issued by the European Patent Office in counterpart European Application No. 19 762 283.0, "Summons to attend oral proceedings pursuant to Rule 115(1) EPC".
Reexamination Notification dated Aug. 19, 2022 by the Chinese Patent Office for Chinese Patent Application No. 201910738429.3.
Reexamination Decision, dated Nov. 29, 2022 issued by the Chinese Patent Office for Chinese Patent Application No. 201910738429.3.
Office Action, dated Feb. 6, 2023, issued by the Taiwan Patent Office for Taiwan Patent Application No. 108128335.

\* cited by examiner

1000

200

APPARATUS AND METHOD WITH ARTIFICIAL INTELLIGENCE FOR SCALING IMAGE DATA

CROSS-REFERENCE TO RELATED APPLICATION(S)

This application is a Continuation Application of U.S. application Ser. No. 16/535,784, filed on Aug. 8, 2019, which is based on and claims priority under 35 U.S.C. § 119 to Korean Patent Application No. 10-2018-0093511, filed on Aug. 10, 2018, in the Korean Intellectual Property Office, the disclosure of which is incorporated by reference herein in its entirety.

BACKGROUND

1. Field

The disclosure relates to an electronic apparatus, a control method, and a control method of a server, and more particularly, to an electronic apparatus for improving an image streaming environment by transmitting and receiving a high-definition image, a control method, and a control method of a server.

2. Description of Related Art

An artificial intelligence (AI) system is a system that trains itself and which implements human-level intelligence. A recognition rate of the AI system increases with an increase in usage of the AI system.

AI technology includes machine learning (e.g., deep learning) techniques using algorithms that self-classify and self-train using features of input data, and element techniques that simulate functions of recognition, determination, etc. of a human brain by using machine learning algorithms.

The element technology may include at least one of, for example, linguistic understanding for recognizing human language/characters, visual understanding for recognizing objects as if they are perceived by a human being, reasoning/prediction for determining information and logically reasoning and predicting the information, knowledge representation for processing experience information of a human being as knowledge data, motion control for controlling autonomous driving of a vehicle, and movement of a robot, etc.

Particularly, a network state is a crucial factor for image quality of a streaming system for performing streaming by compressing and restoring an image adaptively. However, network resources are limited. Thus, it is difficult for a user to use high-definition content unless a large amount of resources is available.

In addition, video capacity is continuously increasing with the improvement of image quality, but network bandwidth is not keeping up with this increase. Accordingly, the importance of codec performance for securing image quality through the image compression and restoration processes is increasing.

SUMMARY

Provided are an electronic apparatus, a control method thereof, and a control method of a server, and more particularly, an electronic apparatus for upscaling a downscaled image by selecting an improved filter set among a plurality of filter sets, a control method thereof, and a control method of a server.

According to an embodiment, there is provided a method for controlling an electronic apparatus, the method includes receiving image data and information associated with a filter set that is applied to an artificial intelligence model for upscaling the image data from an external server, decoding the image data based on receiving the image data, upscaling the decoded image data using a first artificial intelligence model that is obtained based on the information associated with the filter set, and providing the upscaled image data for output.

The information associated with the filter set includes index information of the filter set, and the upscaling includes obtaining the first artificial intelligence model to which one of a plurality of trained filter sets stored in the electronic apparatus is applied based on the index information, and upscaling the decoded image data by inputting the decoded image data into the obtained first artificial intelligence model.

The image data is obtained by encoding downscaled image data acquired by inputting original image data corresponding to the image data into a second artificial intelligence model for downscaling original image data.

A number of filters of the first artificial intelligence model may be smaller than a number of filters of the second artificial intelligence model.

The information associated with the filter set is information obtained by the external server, and identifies a filter set that minimizes a difference between the upscaled image data acquired by the first artificial intelligence model and the original image data.

The first artificial intelligence model may be a Convolutional Neural Network (CNN).

The providing may include displaying the upscaled image data.

According to an embodiment, there is provided a method that includes obtaining downscaled image data by inputting original image data into an artificial intelligence downscaling model for downscaling image data, obtaining a plurality of upscaled image data by respectively inputting the downscaled image data into a plurality of artificial intelligence upscaling models to which respective filter sets, of a plurality of filter sets, trained for upscaling the downscaled image data are applied, encoding the downscaled image data by adding information associated with a filter set of an artificial intelligence upscaling model that outputs upscaled image data having a minimum difference from the original image data among the plurality of upscaled image data; and transmitting the encoded image data to an external electronic apparatus.

The method may further include training parameters of the plurality of filter sets to reduce a difference between the plurality of upscaled image data and the original image data.

A number of filters of the artificial intelligence upscaling model may be smaller than a number of filters of the artificial intelligence downscaling model.

According to an embodiment, there is provided an electronic apparatus, including a communication interface including communication circuitry, and a processor that is configured to: receive image data and information associated with a filter set applied to an artificial intelligence model for upscaling the image data from an external server via the communication interface, decode the received image data, upscale the decoded image data using a first artificial intelligence model that is obtained based on the information associated with the filter set, and provide the upscaled image data for output.

The electronic apparatus may further include a memory. The information associated with the filter set includes index information of the filter set, and the processor is further configured to obtain the first artificial intelligence model in which one of a plurality of trained filter sets stored in the memory is applied based on the index information, and upscale the decoded image data by inputting the decoded image data into the obtained first artificial intelligence model.

The image data may be obtained by encoding downscaled image data acquired by inputting original image data corresponding to the image data into a second artificial intelligence model for downscaling original image data.

A number of filters of the first artificial intelligence model may be smaller than a number of filters of the second artificial intelligence model.

The information on the filter set may be information obtained by the external server to reduce a difference between the upscaled image data obtained by the first artificial intelligence model and the original image data.

The first artificial intelligence model may be a Convolutional Neural Network (CNN).

The electronic apparatus may further include a display, and the processor is configured to provide the upscaled image data for output by controlling the display to display the upscaled image data.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
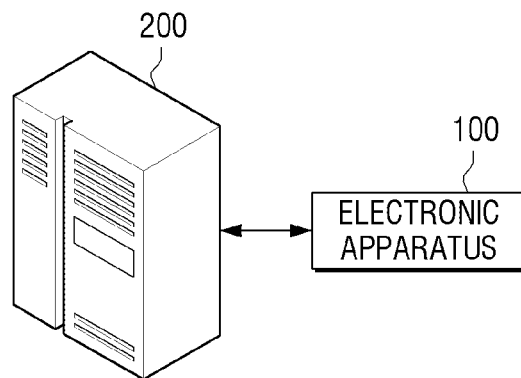
FIGS. 1 and 2 are diagrams of an image streaming system according to an embodiment.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The terms used in this specification will be briefly described, and the disclosure will be described in detail.

All the terms used in this specification including technical and scientific terms have the same meanings as would be generally understood by those skilled in the art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire content of this disclosure and technical knowledge in the art.

The present disclosure is not limited to an embodiment disclosed herein and may be implemented in various forms, and the scope of the present disclosure is not limited to the following embodiments. In addition, all changes or modifications derived from the meaning and scope of the claims and their equivalents should be construed as being included within the scope of the disclosure. In the following description, a configuration which is publicly known but irrelevant to the gist of the disclosure could be omitted.

The terms such as "first," "second," etc. may be used to describe a variety of elements, but the elements should not be limited by these terms. The terms are used to distinguish one element from other elements.

A singular expression of a term also includes the plural meaning as long as it does not mean differently in the context of the term. In this disclosure, terms such as "include" and "have/has" should be construed as designating that there are such features, numbers, operations, elements, components or a combination thereof in the disclosure, and not to exclude the existence or possibility of adding one or more of other features, numbers, operations, elements, components or a combination thereof.

In an embodiment, "a module," "a unit," or "a part," or the like, perform at least one function or operation, and may be realized as hardware, such as a processor or integrated circuit, software that is executed by a processor, or a combination thereof. In addition, a plurality of "modules," a plurality of "units," a plurality of "parts," or the like, may be integrated into at least one module or chip and may be realized as at least one processor, except for "modules," "units," or "parts" that should be realized as specific hardware.

Hereinafter, embodiments of the disclosure will be described in detail with reference to the accompanying drawings so that those skilled in the art can carry out the embodiments of the present disclosure. However, the disclosure may be embodied in many different forms and is not limited to the embodiments described herein. In order to clearly illustrate the disclosure in the drawings, some of the elements that are not essential to the complete understanding of the disclosure are omitted for clarity, and like reference numerals refer to like elements throughout the specification.

Hereinafter, the disclosure will be described in greater detail with reference to the drawings.

FIG. 1 is a diagram of an image streaming system according to an embodiment.

Referring to FIG. 1, an image streaming system 1000 may include an electronic apparatus 100 and a server 200.

The server 200 may generate encoded image data. The encoded image data may be image data that is encoded after original image data is downscaled by the server 200.

The server 200 may downscale original image data using an AI model for downscaling image data. The server 200 may downscale image data on a pixel basis, on a block basis, on a frame basis, or the like.

The server 200 may acquire a plurality of image data obtained by upscaling downscaled image data after applying a plurality of filter sets to an AI model for upscaling image data. The server 200 may upscale the downscaled image data on a pixel basis, on a block basis, on a frame basis, or the like. A filter set may include a plurality of filters applied to an AI model. The number of filters applied to the AI model for upscaling may be smaller than the number of filters applied to an AI model for downscaling. This is because the filter layer of the electronic apparatus 100, which operates as a decoder, might not be deeply formed due to the real-time nature of the decoder operation.

Each of the plurality of filters may include a plurality of parameters. That is, the filter set may be a collection of parameters for obtaining an AI model. The parameter may be referred to as a weight, a coefficient, etc.

The plurality of filter sets may be trained in advance and stored in the server 200. The plurality of filter sets may provide an improved compression rate for obtaining an upscaled image having a minimum difference from the original image data. The trained data may be a plurality of parameters applied to the downscaling AI model and a plurality of parameters to which the upscaling AI model is applied. For example, the plurality of filter sets may be trained based on the genre of the image data. The detailed description of an example embodiment will be made in more detail with reference to FIG. 13.

The server 200 may identify a filter set for generating image data having a minimum difference from original image data among the plurality of upscaled image data. An improved filter set may be identified for each frame of image data.

The server 200 may transmit information associated with the encoded image and the filter set to the electronic apparatus 100. The information associated with the filter set may include index information of the identified filter set. The index information of the filter set may be used for distinguishing filter sets constituted by a plurality of parameters. For example, when n filter sets such as filter 1, filter 2, ..., filter n are stored in the electronic apparatus 100 and the server 200, the values of 1, 2, ..., and n may be defined as index information.

The electronic apparatus 100 may decode the received image data, and perform upscaling. The received image data may be encoded data received from the server 200. The electronic apparatus 100 may perform upscaling of decoded image data by using an upscaling AI model.

The electronic apparatus 100 may store a plurality of filter sets for upscaling image data. The plurality of filter sets stored in the electronic apparatus 100 may be the same as the plurality of filter sets stored in the server 200.

The electronic apparatus 100 may obtain an upscaled image by inputting decoded image data into an upscaling AI model obtained based on the filter set included in the image data received from the server 200. Specifically, the electronic apparatus 100 may obtain the upscaling AI model for upscaling by using a single filter set based on the information associated with the filter set received from the server 200 among the plurality of filter sets stored in the electronic apparatus 100.

The electronic apparatus 100 may provide upscaled image data for output.

When the electronic apparatus 100 is a display device including a display such as a personal computer (PC), a television (TV), a mobile device, etc., the electronic apparatus 100 may provide the upscaled image data for display via the display of the electronic apparatus 100.

When the electronic apparatus 100 is an apparatus that does not include a display, such as a set-top box or a server, the electronic apparatus 100 may provide the upscaled image data to an external device with a display, so that the external device may display the upscaled image data.

As described above, by way of identifying an improved upscaling filter set through a plurality of upscaling processes in advance in an encoding process by a server, a restoration process in an electronic apparatus can be simplified. Therefore, a high compression rate may be achieved in an image streaming environment, and thus a high definition image can be transmitted in the image streaming environment.

Figure 2:
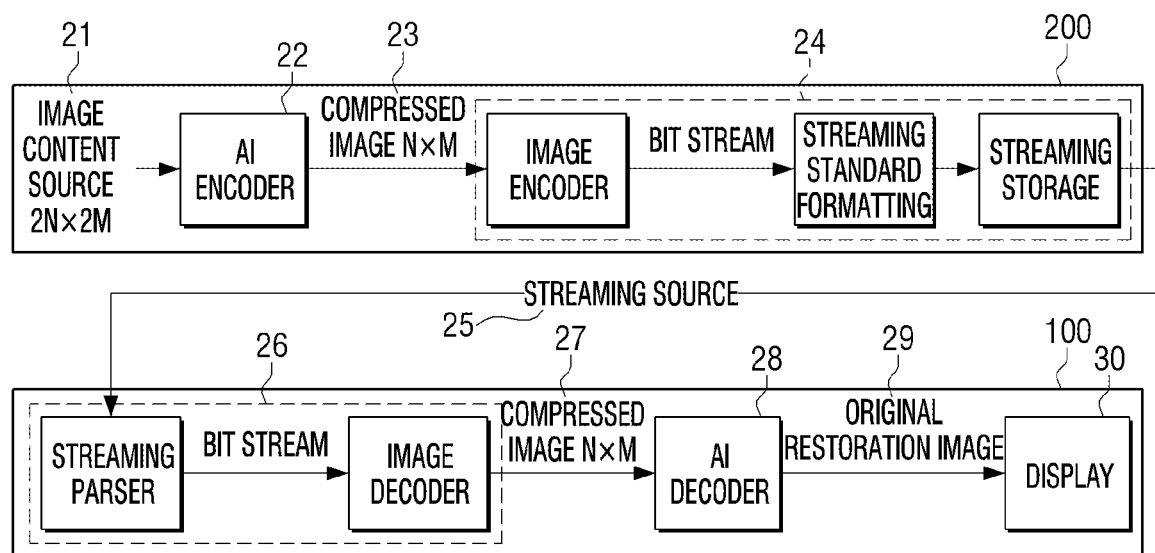

FIG. 2 is a diagram of an image streaming system of FIG. 1.

Referring to FIG. 2, the server 200 may input original image data 21 into an AI encoder 22. The original image data 21 may be an image content source. For example, the size of the original image data 21 may be 2N×2M.

The AI encoder 22 may receive the original image data 21 that is sized 2N×2M, and obtain a compressed image 23 that is sized N×M. The AI encoder 22 may downscale the original image data 21 by using a downscaled AI model. The AI encoder 22 may obtain a plurality of upscaled image data obtained by upscaling the compressed image 23 by using an AI model to which each of the plurality of filter sets is applied. The AI encoder 22 may identify a filter set used for generating image data that is most similar to the original image data 21 among the plurality of upscaled image data. An example embodiment of the filter set will be described in more detail with reference to FIG. 8.

The filter may be a mask with parameters and may be defined by a matrix of parameters. The filter may be referred to as windows or a kernel. The parameter constituting a matrix in a filter may include 0 (e.g., a zero value), a zero element that can be approximated by 0, or a non-zero element having a constant value between 0 and 1, and may have various patterns depending on its function.

For example, when an AI model is embodied with a Convolutional Neural Network (CNN) for recognizing an image, an electronic apparatus may place a filter with parameters on an input image, and determine a sum of values obtained by multiplying respective parameters of the image and the filter (a convolution calculation) as a pixel value of an output image to extract a feature value.

Figure 11:
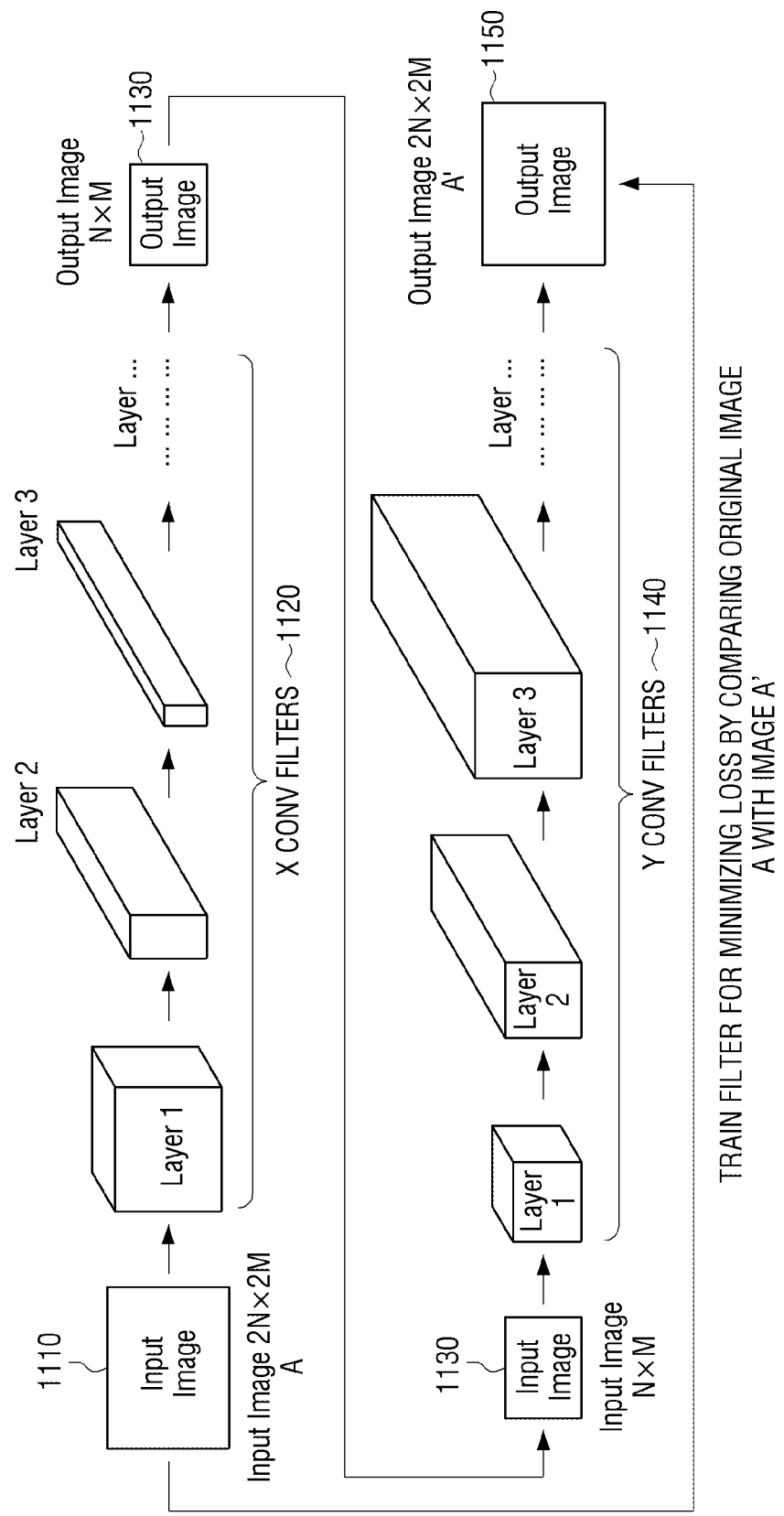
FIG. 11 is a diagram of a training method of a filter set according to an embodiment.

A plurality of feature values may be extracted through multiple filters for extracting a strong feature of the input image data, and a plurality of feature values may be extracted depending on the number of filters. The convolutional image processing may be repeated by multiple layers as shown in FIG. 11, and each of the layers may include a plurality of filters. Meanwhile, filters to be trained may vary depending on the training object of the CNN, and the pattern of the filters to be selected may vary. For example, the filter to be trained or selected may vary depending on whether the training object of the CNN is downscaling or upscaling of the input image, the genre to which the image belongs, etc.

The server 200 may perform an encoding process 24 by using information associated with the compressed image 23 that is sized N×M obtained from the AI encoder 22 and the filter set applied for improved upscaling.

The encoding process 24 may be a general encoding process. To be specific, an image encoder may generate a bit stream by performing the encoding of the compressed image 23 that is sized N×M. The generated bit stream may be generated according to a streaming standard format by a streaming standard formatter. The process of generating a bit stream will be described in more detail with reference to FIG. 13. The generated and compressed bit stream may be stored in a streaming storage.

The server 200 may transmit the stored streaming source 25 to the electronic apparatus 100. The transmitted compressed bit stream may include information associated with the encoded image data and the filter set for improved upscaling.

The electronic apparatus 100 may obtain a compressed image 27 that is sized N×M by performing a decoding process 26 using the received streaming source 25. The obtained compressed image 27 that is sized N×M may correspond to the compressed image 23 that is sized N×M before encoding. The electronic apparatus 100 may obtain a bit stream by inputting the streaming source 25 to a streaming parser, and obtain the decoded compressed image 27 that is sized N×M by inputting the obtained bit stream into an image decoder.

The electronic apparatus 100 may perform upscaling by inputting the decoded compressed image 27 that is sized N×M into an AI decoder 28. The electronic apparatus 100 may obtain an upscaling AI model for upscaling by applying one of the plurality of stored filter sets, and obtain an original restoration image 29 that is sized 2N×2M by using the obtained upscaling AI model. The electronic apparatus 100 may select one of the plurality of filter sets based on the information associated with the filter set that is included in the received streaming source 25.

The electronic apparatus 100 may control a display 30 to display an original restoration image 29. When a display is not provided in the electronic apparatus 100, the electronic apparatus 100 may provide the original restoration image 29 to an external display device to be displayed.

Meanwhile, the AI encoder 22, image encoder, and streaming standard formatting component are shown as separate components for convenience of explanation. However, in another embodiment, the foregoing components may be implemented by a single processor. In the same manner, the streaming parser, image decoder, and AI decoder 28 may also be implemented by a single processor.

As described above, high quality image compression is possible by downscaling and upscaling image data using an AI model, and thus a high-definition image can be transmitted.

Figure 3:
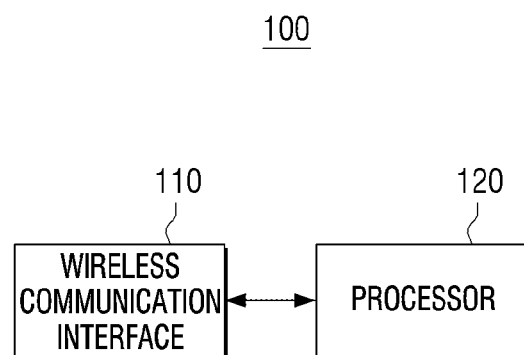
FIG. 3 is a block diagram of an electronic apparatus according to an embodiment.

FIG. 3 is a block diagram of an electronic apparatus according to an embodiment.

Referring to FIG. 3, an electronic apparatus 100 may include a wireless communication interface 110 and a processor 120.

Figure 4:
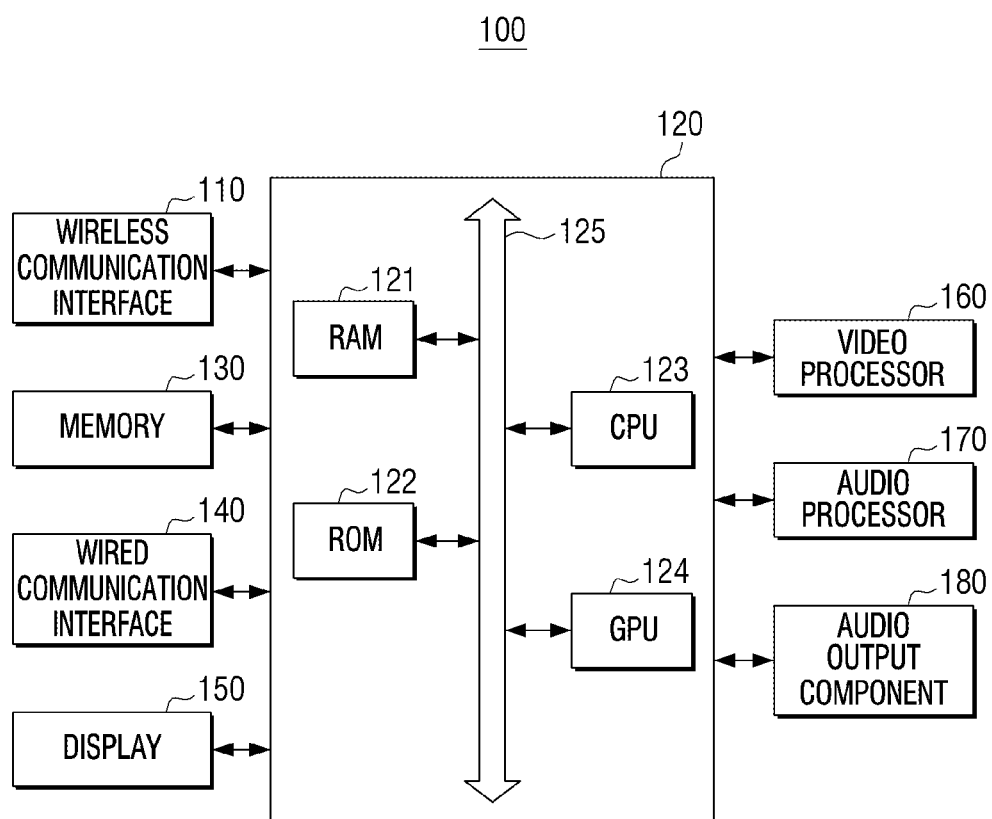
FIG. 4 is a block diagram of an electronic apparatus according to an embodiment.

The wireless communication interface 110 may be configured to perform communication with various types of external devices according to various types of communication methods. The electronic apparatus 100 may perform communication with an external device using a wired or wireless communication method. However, according to an embodiment, and for ease of explanation, in the case of a wireless communication method, it will be described that communication is performed by the wireless communication interface 110, and in the case of wired communication, communication is performed by a wired interface 140 as shown in FIG. 4.

The wireless communication interface 110 may receive image data from an external device using a wireless communication method such as wireless fidelity (Wi-Fi), Bluetooth, Near Field Communication (NFC), etc. According to an embodiment, the electronic apparatus 100 may perform image processing by receiving an image selected by a user from among a plurality of images stored in the memory 130 provided in the electronic apparatus 100.

When the electronic apparatus 100 is configured to perform wireless communication, the wireless communication interface 110 may include a Wi-Fi chip, a Bluetooth chip, a wireless communication chip, an NFC chip, etc. The Wi-Fi chip or the Bluetooth chip may perform communication using a Wi-Fi method, and a Bluetooth method, respectively. When the Wi-Fi chip or the Bluetooth chip is used, various connectivity information such as a service set identifier (SSID) and a session key may be first transmitted and received, communication connection may be established based on the connectivity information, and various information may be transmitted and received based thereon. The wireless communication chip refers to a chip that performs communication according to various communication standards such as an Institute of Electrical and Electronics Engineers (IEEE) standard, ZigBee, Third Generation (3G), Third Generation Partnership Project (3GPP), Long Term Evolution (LTE), Fifth Generation (5G), etc. The NFC chip refers to a chip operating in an NFC mode using a 13.56 MHz band among various radio-frequency identification (RFID) frequency bands such as 135 kHz, 13.56 MHz, 433 MHz, 860 to 960 MHz, and 2.45 GHz.

The electronic apparatus 100 may receive image data and information associated with a filter set applied to the AI model for upscaling image data from an external server via the wireless communication interface 110.

The image data that is received from an external server may be image data encoded by the external server. The encoded image data may be obtained by encoding downscaled image data obtained by inputting original image data into an AI model for downscaling.

The information associated with the filer set may be included with the image data (e.g., as metadata). The information associated with the filter set may be obtained from the external server in order to minimize a difference between the upscaled image data obtained by an AI model for upscaling image data and the original image data. The information associated with the filter set may be obtained for each frame of image data. The process of obtaining information associated with the filter set from the external sever will be described in more detail with reference to FIG. 7.

The processor 120 may control the overall operation of the electronic apparatus 100.

According to an embodiment, the processor 120 may be implemented as a digital signal processor (DSP), a microprocessor, or a time controller (TCON), but is not limited thereto. The processor 120 may include one or more central processing units (CPUs), a microcontroller unit (MCU), a micro processing unit (MPU), a controller, an application processor (AP), a communication processor (CP), an Advanced RISC Machine (ARM) processor, or the like, or may be defined by the corresponding terms. The processor 120 may be implemented as a system on chip (SoC), a large scale integration (LSI) with a built-in processing algorithm, or in the form of a Field Programmable Gate Array (FPGA).

The processor 120 may decode image data received via the wireless communication interface 110. The processor 120 may generate compressed image data by decoding encoded image data received from the external server.

The processor 120 may upscale decoded image data by inputting the decoded image data into the AI model for upscaling based on the received information associated with the filter set. The term "upscaling" may also be referred to as "compression release," "image restoration," etc. The processor 120 may apply the received information associated with the filter set to obtain all or some of a plurality of filters constituting an AI model. Obtaining some of a plurality of filters may mean that some of the plurality of filters constituting an AI model is default, and only some of the remaining filters is obtained based on the received information of the filter set.

According to another embodiment, when a plurality of filter sets is not stored in the memory 130, the processor 120 may control the wireless communication interface 110 to transmit the received information associated with the filter set to a second external server. When receiving parameter information corresponding to a filter set transmitted from the second external server via the wireless communication interface 110, the processor 120 may obtain an AI model for upscaling using the received parameter information, and upscale decoded image data using the obtained AI model.

The processor 120 may provide upscaled image data for output. The processor 120 may control the wireless communication interface 110 to provide upscaled image data to an external display device. Referring to FIG. 4, when a display 150 is provided in the electronic apparatus 100, the processor 120 may control the display 150 to display upscaled image data.

As described above, an electronic apparatus 100 according to an embodiment may receive information associated with encoded image data and an improved filter set from an external server, thereby reducing time and resources consumed during restoration of the image data. Therefore, a high compression rate of an image can be realized, and a high-definition image can be compressed to image data of a smaller size and transmitted.

FIG. 4 is a block diagram of an electronic apparatus according to an embodiment.

Referring to FIG. 4, an electronic apparatus 100 may include a wireless communication interface 110, a processor 120, a memory 130, a wired interface 140, a display 150, a video processor 160, an audio processor 170, an audio output component 180, etc.

The wireless communication interface 110 and the processor 120 may include the same configuration as those described in FIG. 3, and thus redundant description will be omitted.

The memory 130 may store various programs and data for the operation of the electronic apparatus 100. To be specific, at least one command may be stored in the memory 130. The processor 120 may perform the operations described herein by executing commands stored in the memory 130. The memory 130 may be embodied with a non-volatile memory, a volatile memory, a flash-memory, a hard disk drive (HDD), a solid state drive (SDD), or the like.

The trained AI model may be stored in the memory 130. The trained AI model may include a plurality of layers for upscaling image data. Each of the plurality of layers may include a plurality of filters. Each of the plurality of filters may include a plurality of parameters. For example, the trained AI model may be a convolutional neural network (CNN).

The plurality of filters each may be applied to an entire frame of image data. According to an embodiment, a filter that applies the same parameter to each frame of image data may be used, but image data may be upscaled using a filter that applies a different parameter to each frame.

A plurality of trained filter sets may be stored in the memory 130. Specifically, each filter set may include a plurality of parameters, and the plurality of trained parameters may be stored in the memory 130. The plurality of filter sets maybe distinguished based on individually given index information. The filter set stored in the memory 130 may be trained in advance so that upscaled image data that is most similar to original image data after input image data is downscaled may be obtained. The input image data may be image data of various genres. An example embodiment of training a filter set will be described in more detail with reference to FIG. 13.

The operation of an AI model according to an embodiment may be performed under the control of the processor 120.

The processor 120 may obtain an AI model to which one of a plurality of filter sets stored in the memory 130 is applied based on index information included in the received information associated with the filter set. The processor 120 may upscale decoded image data by inputting decoded image data into an AI model to which a filter set corresponding to the received index information is applied.

The processor 120 may perform various operations according to the purpose of the AI model stored in the memory 130.

As an example, if an AI model relates to image recognition and/or visual comprehension such as a technology for recognizing and processing an object as if it was perceived by a human being, then the processor 120 may perform object recognition, object tracking, image searching, human recognition, scene understanding, spatial understanding, image enhancement, etc. of an input image using an AI model.

As another example, if an AI model relates to information recommendation and/or inference prediction such as a technology for judging and logically inferring and predicting information, then the processor 120 may perform knowledge/probability based reasoning, optimization prediction, preference based planning, and recommendation using the AI model.

As another example, if an AI model relates to query processing and/or knowledge representation such as a technology for automating human experience information into knowledge data, then the processor 120 may perform knowledge building (e.g., data generation and classification) and knowledge management (data utilization) using the AI model.

As described above, by way of obtaining an AI model for upscaling image data based on the received information associated with the image data and the filter set, and obtaining upscaled image data by inputting decoded image data into the obtained AI model, an improved restoration image can be obtained even if a small amount of time and resources are used.

The wired interface 140 may be configured to connect the electronic apparatus 100 to an external device using a wired communication method. The wired interface 140 may input and output at least one of audio signals and video signals via a wired communication method such as a cable or a port.

The wired interface 140 may be a display port, a high definition multimedia interface (HDMI), a digital visual interface (DVI), a red green blue (RGB) interface, a D-sub-miniature (DSUB) interface, an S-Video interface, a Composite Video interface, universal serial bus (USB), Thunderbolt type ports, or the like.

The display 150 may display upscaled image data. The image displayed on the display 150 may be upscaled by the trained AI model. According to the purpose of the AI model, an object included in the image may be displayed on the display 150, and the types of objects may be displayed.

The display 150 may be implemented as various types of displays such as a light emitting diode (LED), a liquid crystal display (LCD), an organic light emitting diode (OLED) display, a plasma display panel (PDP), or the like. The display 150 may further include a driving circuit, which may be implemented in the form of an amorphous-silicon (a-Si) thin film transistor (TFT), a low temperature poly silicon (LTPS) TFT, an organic TFT (OTFT), etc., a backlight unit, or the like. Meanwhile, the display 150 may be implemented as a flexible display.

The display 150 may include a touch sensor for detecting a touch gesture of a user. The touch sensor may be embodied as various types of sensors such as an electrostatic type, a pressure sensitive type, a piezoelectric type, etc. When the image processing apparatus 100 supports a pen input function, the display 150 may detect a user gesture using an input means such as a pen as well as a user's finger. When the input means is a stylus pen including a coil therein, the image processing apparatus 100 may include a magnetic field sensor capable of sensing magnetic field changed by the coil in the stylus pen. Accordingly, the display 150 may detect an approximate gesture, i.e., hovering as well as a touch gesture.

Although the display function and the gesture detection function have been described as being performed in the same configuration as described above, the functions may be performed in different configurations. According to various embodiments, the display 150 may not be included in the electronic apparatus 100. For example, when the electronic apparatus 100 is a set-top box, or a server, the display 150 may not be provided. In this case, upscaled image data may be transmitted to an external display device via the wireless communication interface 110 or the wired interface 140.

The processor 120 may include a random access memory (RAM) 121, a read-only memory (ROM) 122, a CPU 123, a Graphic Processing Unit (GPU) 124, and a bus 125. The RAM 121, the ROM 122, the CPU 123, the Graphic Processing Unit (GPU) 124, and the like may be connected to one another via the bus 125.

The CPU 123 may access the memory 130 and perform booting by using an operating system (O/S) stored in the memory 130. The CPU 123 may perform various operations by using various programs, content, data, etc. stored in the memory 130.

A command set, etc. for system booting may be stored in the ROM 122. When a turn-on command is input and power is supplied, the CPU 123 may copy the O/S stored in the memory 130 to the RAM 121 according to the command stored in the ROM 122, execute the O/S, and perform system booting. When the system booting is completed, the CPU 123 may copy the various programs stored in the memory 130 to the RAM 121, execute the various programs copied to the RAM 121, and perform various operations.

When the booting of the electronic apparatus 100 is completed, the GPU 124 may display a user interface (UI) on the display 150. For example, the GPU 124 may generate a screen including various objects such as icons, images, texts, etc. by using a calculation unit (not shown) and a rendering unit (not shown). The calculation unit may calculate attribute values such as coordinate values, shapes, sizes, colors, etc. of the objects according to the layout of the screen. The rendering unit may generate screens of various layouts including objects based on the attribute values calculated by the calculation unit. The screen (or a UI window) generated by the rendering unit may be provided to the display 150, and displayed in a main display area and a sub-display area.

The video processor 160 may be configured to process content received via the wireless communication interface 110 or the wired interface 140, or video data included in the content stored in the memory 130. The video processor 160 may perform various image processing such as decoding, scaling, noise filtering, frame rate conversion, resolution conversion, etc. of video data.

The audio processor 170 may be configured to process content received via the wireless communication interface 110 or the wired interface 140, or audio data include in the content stored in the memory 130. The audio processor 170 may perform various processing such as decoding, amplification, noise filtering, etc. of audio data.

When a reproduction application with respect to multimedia content is executed, the processor 120 may drive the video processor 160 and the audio processor 170 to reproduce content. The display 150 may display the image frame generated by the video processor 160 on at least one of a main-display area and a sub-display area.

As described above, the processor 120, the video processor 160, and the audio processor 170 are described as separate components. However, according to an embodiment, the foregoing components are embodied as a single chip. For example, the processor 120 may function as the video processor 160 and the audio processor 170.

The audio output component 180 may output audio data generated by the audio processor 170.

Although not shown in FIG. 4, according to an embodiment, the electronic apparatus 100 may further include various external input ports for connecting with various external terminals or peripherals such as a headset, a mouse, etc., a digital multimedia broadcasting (DMB) chip for receiving and processing a DMB signal, buttons for receiving user's operation, a microphone for receiving voices or sounds of a user to be converted into audio data, a capturing unit (e.g., a camera) for capturing a still image or a video according to the control of a user, various sensors, etc.

Figure 5:
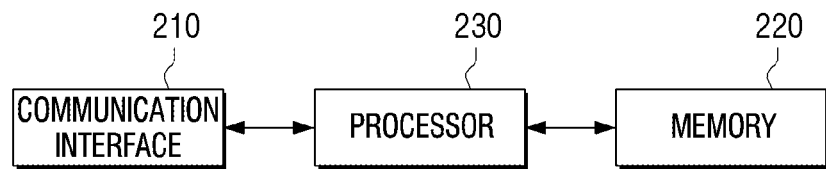
FIG. 5 is a block diagram of a server according to an embodiment.

FIG. 5 is a block diagram of a server according to an embodiment.

Referring to FIG. 5, a server 200 may include a communication interface 210, a memory 220, and a processor 230.

The communication interface 210 may perform communication with an external device using a wired or a wireless communication method.

The communication interface 210 may be connected to an external device in a wireless manner such as wireless local-area network (LAN), Bluetooth, etc. The communication interface 210 may be connected to an external device using Wi-Fi, ZigBee, Infrared ray (IrDA), or the like. The communication interface 210 may include a connection port of a wired communication method.

The server 200 may transmit encoded image data to an electronic apparatus 100 via the communication interface 210. The image data transmitted to the electronic apparatus 100 may include information associated with a filter set for improved image restoration. The information associated with the filter set may be obtained by the processor 230.

The memory 220 may store various programs and data for the operation of the server 200. At least one command may be stored in the memory 220. The processor 230 may perform the above-described operations by executing the command stored in the memory 220.

The memory 220 may store the trained AI model. To be specific, the trained AI model for downscaling image data may include a plurality of layers for downscaling. Each of the plurality of layers may include a plurality of filters. Each of the plurality of filters may include a plurality of parameters.

The trained AI model for upscaling image data may be stored in the memory 220. The trained AI model for upscaling image data may include a plurality of layers for upscaling. Each of the plurality of layers may include a plurality of filters. Each of the plurality of filters may include a plurality of parameters.

An AI model used for downscaling or upscaling may be a CNN. The number of AI models for upscaling may be smaller than the number of artificial intelligence models for downscaling.

Each of the plurality of filters may be applied to an entire frame of image data. To be specific, according to an embodiment, a filter that applies the same parameter to each frame of image data may be used, but a filter that applies a different parameter to each frame may be used for upscaling image data.

The memory 220 may store a plurality of trained filter sets. The plurality of filter sets stored in the memory 220 may include a filter set applied to an AI model for upscaling image data. To be specific, a filter set may include a plurality of parameters, and the memory 220 may include a plurality of trained parameters. The plurality of filter sets may be distinguished based on individually given index information. The filter sets stored in the memory 220 may be trained in advance to minimize a difference between upscaled image data and original image data after input image data is downscaled. In this case, a general similarity analysis method (e.g., peak signal to noise ratio (PSNR), structural similarity (SSIM), etc.) may be used to identify a difference between upscaled image data and original image data. The input image data may be image data for various genres. An example embodiment of a filter set will be described in more detail with reference to FIG. 13.

The operation of an artificial intelligence model may be performed under the control of the processor 230.

The processor 230 may obtain a plurality of upscaled image data by inputting downscaled image data into an AI model to which each of a plurality of filter sets is applied. The processor 230 may obtain the plurality of upscaled image data by acquiring a plurality of AI models simultaneously. The processor 230 may obtain one upscaled image data by using an AI model to which one of the plurality of filter sets is applied, and then obtain upscaled image data by changing the applied filter set sequentially.

The processor 230 may identify upscaled image data having a minimum difference (e.g., least loss) compared to original image data among the plurality of obtained upscaled image data. The processor 230 may use a general similarity analysis method (e.g., PSNR, SSIM, etc.) to compare the original image data and the obtained upscaled image data.

The processor 230 may encode a downscaled image by including information associated with the filter set applied to the identified image data (e.g., as metadata). The information associated with the filter set may be index information of the filter set. The processor 230 may include information associated with the filter set in supplemental enhancement information (SEI) data attached to the bit stream generated by encoding the downscaled image. The SEI data may provide information associated with a resolution, a bit rate, a frame rate, etc., of image data.

The processor 230 may transmit encoded image data to an external electronic apparatus via the communication interface 210. The information associated with the filter set for improved image restoration may be included with the transmitted image data.

As described above, by way of identifying an improved upscaling filter set through a plurality upscaling processes in advance in an encoding process by a server, a restoration process in an electronic apparatus can be simplified. Therefore, a high compression rate may be achieved in an image streaming environment, and thus a high definition image can be transmitted.

Figure 6:
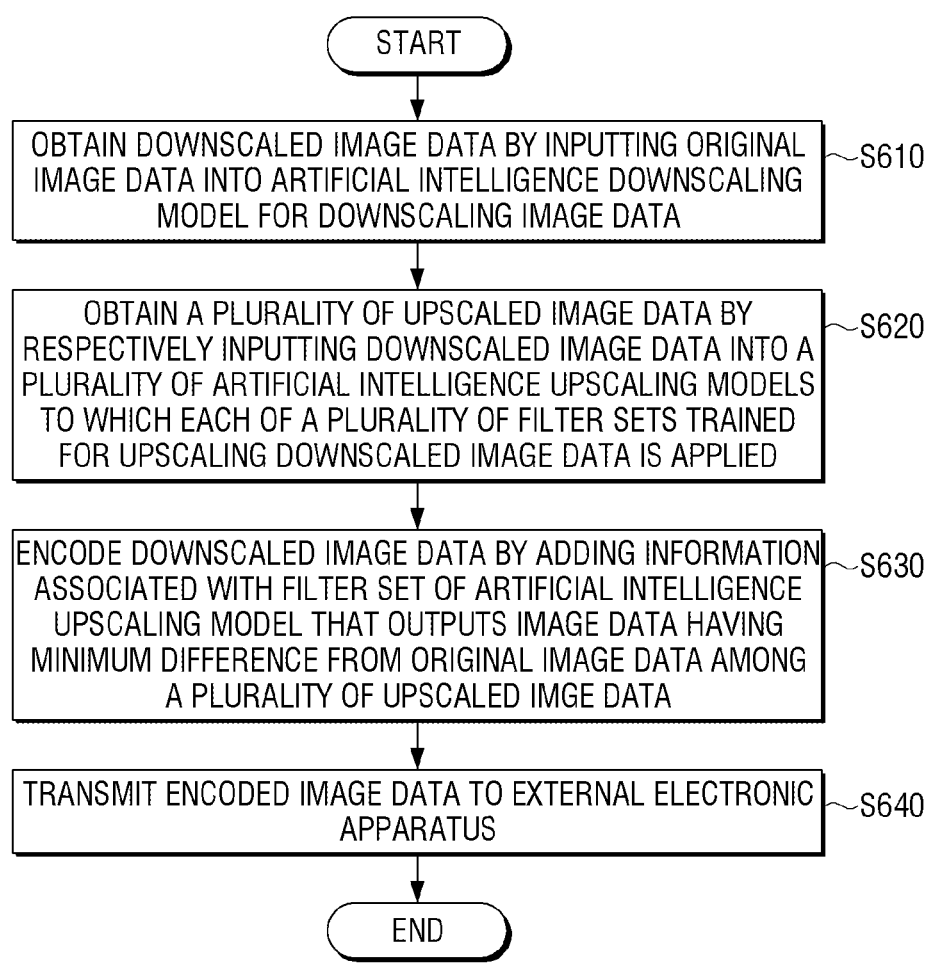
FIG. 6 is a flowchart of an image encoding operation of a server according to an embodiment.

FIG. 6 is a flowchart of an image encoding operation of a server according to an embodiment.

Referring to FIG. 6, a server may obtain downscaled image data by inputting original image data into an artificial intelligence downscaling model for downscaling image data at operation S610. The compression rate of downscaling may be set in advance. For example, referring to FIG. 2, an image that is sized 2N×2M may be compressed using a compression rate of ¼ to be downscaled to an image that is sized N×M. However, a compression rate is not limited thereto.

The server may obtain a plurality of upscaled image data by inputting downscaled image data into a plurality of artificial intelligence upscaling models to which each of a plurality of filter sets trained for upscaling downscaled image data is applied at operation S620.

The plurality of filter sets may be trained in advance for upscaling image data, and stored in a server. In addition, a filter set that is the same as a filter set of the plurality of filter sets stored in the server may be stored in an external electronic apparatus.

The server may obtain a plurality of upscaled image data using a plurality of AI upscaling models to which each of a plurality of filter sets is applied. In addition, a plurality of upscaled image data may be obtained sequentially such as one upscaled image data that is obtained using an AI upscaling model to which one of a plurality of filter sets is applied, and then another upscaled image data is obtained by changing a filter set applied to an AI upscaling model.

The server may encode downscaled image data by adding information associated with the filter set of the artificial intelligence upscaling model that outputs image data having a minimum difference from original image data among the plurality of upscaled image data at operation S630.

To be specific, the server may compare each of the plurality of upscaled image data with original image data using a similarity analysis method, and identify upscaled image data having a minimum difference as compared to the original image data (e.g., a least loss value, or the like). The server may identify information associated with a filter set applied to an AI upscaling model that outputs the identified upscaled image data. The server may encode the downscaled image data by adding information associated with the identified information of the filter set. The information associated the filter set may be included in SEI information, and may include index information of the filter set. The encoded image data may be obtained by encoding downscaled image data of which a size is compressed, and the encoded image data might be smaller in size than as compared to the original image data.

The server may transmit the encoded image data to an external electronic apparatus at operation S640. The server may transmit encoded image data to which information associated with the filter set is included to the external electronic apparatus, and perform decoding and upscaling using an improved filter set. Therefore, a high-quality image may be transmitted in a streaming environment.

Figure 7:
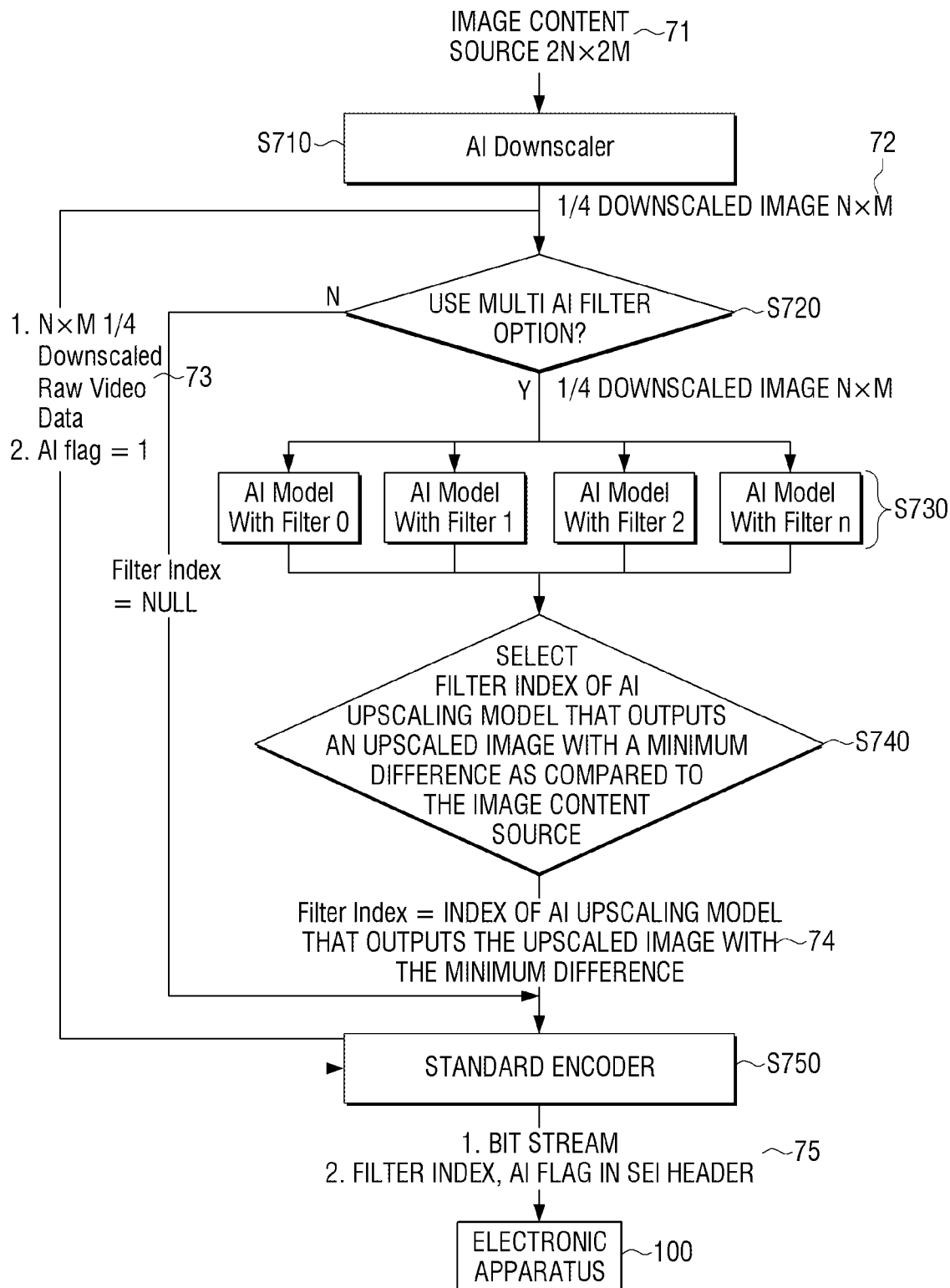
FIG. 7 is a flowchart of an image encoding operation of a server according to an embodiment.

FIG. 7 is a flowchart of an image encoding operation of a server according to an embodiment. Operations 710 through 740 of FIG. 7 may correspond to operations of the AI encoder 22 as described in association with FIG. 2. However, for ease of explanation, it will be described as the operation of the server.

Referring to FIG. 7, the server may input an image content source 71 to an AI downscaling model at operation S710. For example, the image content source 71 may be original image data having a size of 2N×2M. The AI downscaling model may include a plurality of convolutional filters, and the training might have already been completed.

The server may obtain a downscaled image 72 by allowing the image content source 71 to pass through the AI downscaling model. The downscaled image 72 may have a size of N×M, which is ¼ the size of the original image content source 71. The size of the image may correspond to a resolution. However, a compression rate of ¼ is exemplary, and an improved compression rate may be obtained by training.

For example, the AI downscaling model may obtain a feature map by allowing the input image content source 71 to pass through a convolutional layer for each frame, and obtain a compressed image by allowing the obtained feature map to pass through a pooling layer. The pooling layer may divide the input feature map into a predetermined grid, and output a feature map that compiles representative values obtained for respective grids. The size of the feature map output from the pooling layer may be smaller than the size of the feature map input to the pooling layer. The representative value for each grid may be a maximum value included in each grid, or an average value for each grid.

The AI downscaling model may compress an image by repeating operations of the convolutional layer and the pooling layer. As the numbers of convolutional layers and pooling layers increase, a compression rate may increase. As the size of the grid that obtains a representative value from the pooling layer increases, the compression rate may increase.

The server may transmit a raw video data of N×M size that is downscaled by a compression rate of ¼, and an AI flag 73 to a standard encoder at operation S750. The raw video image of N×M size that is downscaled by a compression rate of ¼ may be the same as a downscaled image 72. The AI flag 73 may indicate whether AI downscaling is performed. If the AI flag is set to a value of 1, the AI flag 73 may denote that AI downscaling is performed.

The server may determine whether a multi-AI filter option is used at operation S720. If the server determines that the multi-AI filter option is not used at operation S720 (e.g., S720—N), then the server may transmit a value of filter index=NULL, which means no filter index was used, to the standard encoder at operation S750.

Figure 8:
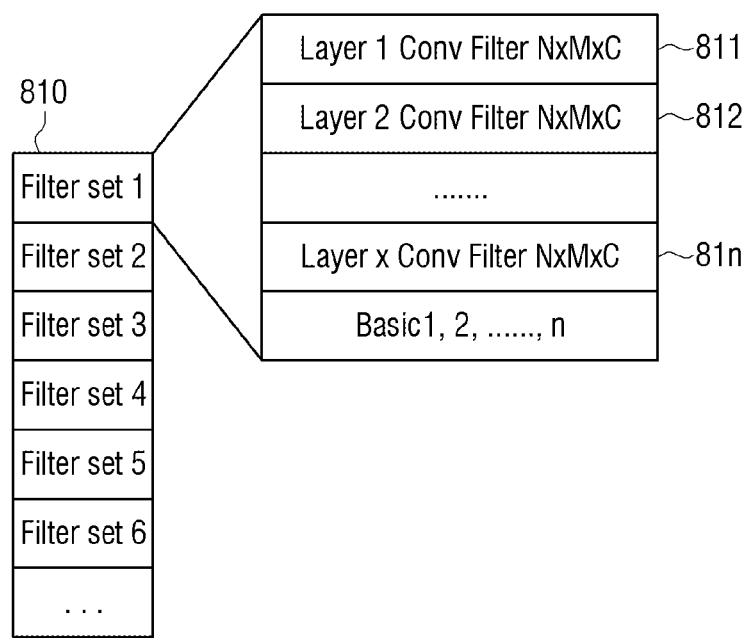
FIG. 8 is a diagram of a filter set according to an embodiment.
Figure 17:
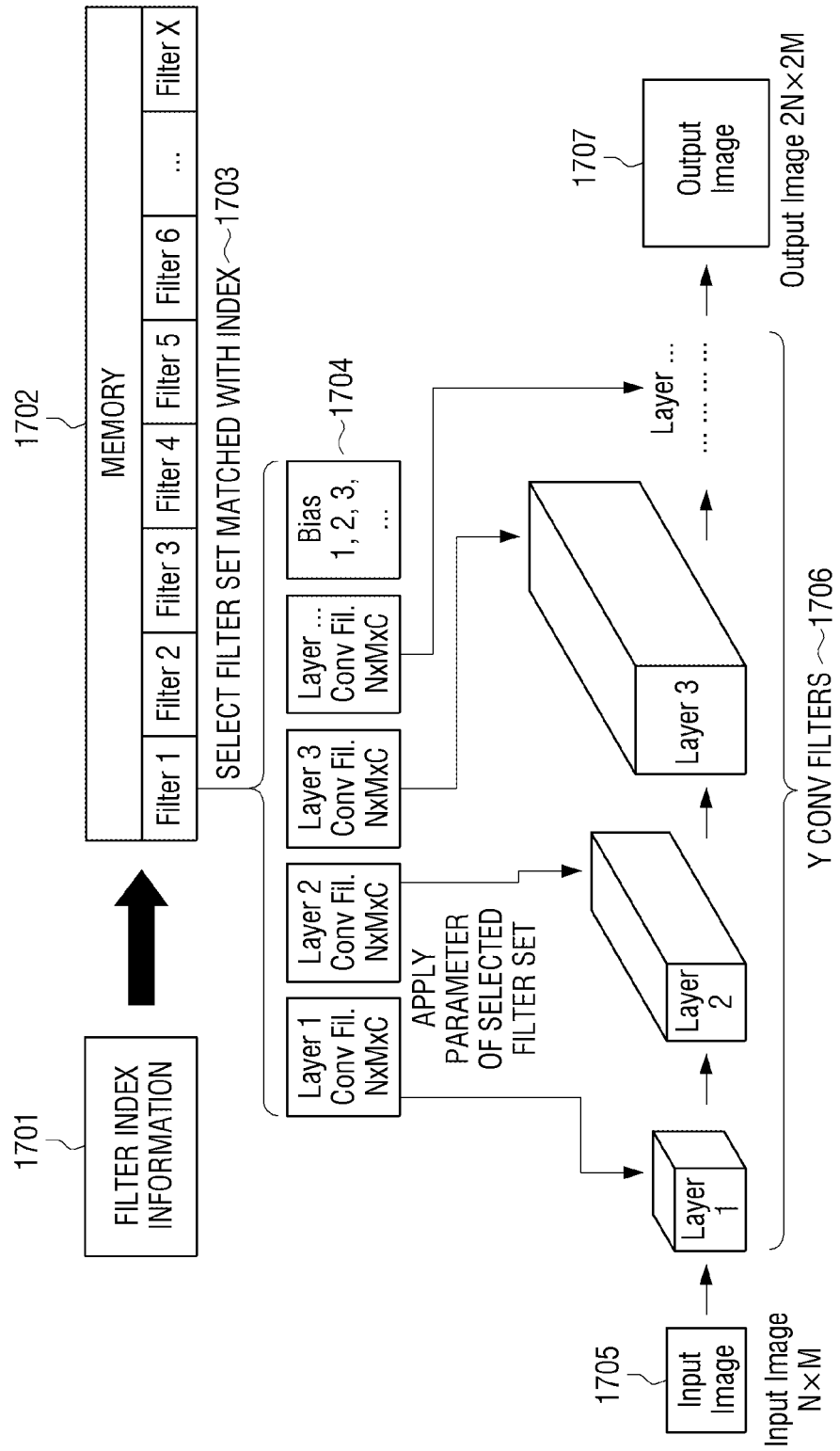
FIG. 17 is a diagram of an image upscaling operation of an electronic apparatus according to an embodiment.

When the server determines that the multi-AI filter option is used at operation S720 (e.g., S720—Y), then the server may input a downscaled image into a plurality of stored AI upscaling models at operation S730. The plurality of AI upscaling models may be obtained by applying each of a plurality of filter sets to an AI model. To be specific, each of the plurality of filter sets may include a plurality of layers as shown in FIG. 8 and FIG. 17. Each layer may be a convolutional filter, and training may have been completed already.

For ease of explanation, FIG. 7 illustrates the use of n AI upscaling models to which filter sets having indices of 0, 1, 2, and n are applied, but in other embodiments, the number of AI upscaling models and index information may be different. A higher compression rate may be achieved by restoring a multi-AI filter function in advance.

The server may select a filter index of an AI model that outputs an upscaled image with a minimum difference as compared to the image content source at operation S740. To be specific, the server may input the downscaled image 72 obtained from the AI downscaling model into each AI upscaling model at operation S730, and obtain an upscaled image from each AI upscaling model at operation S730.

The server may compare the respective upscaled images obtained from each AI upscaling model with the image content source 71, which is an original image, and identify an AI upscaling model that outputs an upscaled image with a minimum difference as compared to the original image content source (e.g., an upscaled image with least loss). The server may transmit index information 74 of the AI upscaling model that outputs the upscaled image with the minimum difference as compared to the original image to the standard encoder at operation S750.

The server may perform encoding by using the transmitted raw video data of N×M size that is downscaled by ¼, the AI flag 73, and filter index information 74. The server may obtain a bit stream by encoding image data, and include information in an SEI header.

The server may transmit the bit stream obtained through an encoding operation and the information 75 included in the SEI header to the electronic apparatus 100.

FIG. 8 is a diagram of a filter set according to an embodiment.

Referring to FIG. 8, each of a plurality of filter sets may include a plurality of layers. The plurality of filer sets may be stored in the sever and the electronic apparatus in the same manner.

For example, a filter set 810 may include n layers 811, 812, . . . , and 81n. Each of the plurality of layers may include a plurality of convolutional filters. Each convolutional filter may be a three-dimensional convolutional filter of width N×height M×channel C (e.g., N×M×C), and active functions bias 1, 2, . . . , and n may be included between filters.

For ease of explanation, FIG. 8 illustrates that filters of a plurality of layers are defined by N×M×C, but in other embodiments, each layer may have a different filter size (N×M), and channel (C). In addition, each filter set may have a different number of layers.

Figure 9:
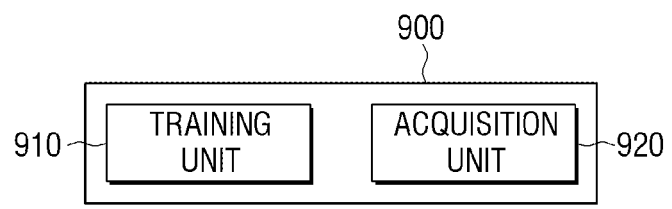
FIG. 9 is a block diagram of an electronic apparatus for training and using an artificial intelligence model according to an embodiment.

FIG. 9 is a block diagram of an electronic apparatus for training and using an artificial intelligence model according to an embodiment.

Referring to FIG. 9, a processor 900 may include at least one of a training unit 910, an acquisition unit 920. The processor 900 of FIG. 9 may correspond to the processor 120 of FIG. 3 and the processor 230 of FIG. 5.

The training unit 910 may generate or train a model for generating a downscaling filter and an upscaling filter. The training unit 910 may generate an AI model for generating a downscaling filter and an upscaling filter of image data using the collected training data. The training unit 910 may generate a trained model having criteria for generating a downscaling filter and an upscaling filter of image data using the collected training data. The training unit 910 may correspond to a training set of an AI model.

For example, the training unit 910 may generate, train, or update a model for predicting the generation of the filter by using original image data and image data obtained by downscaling and upscaling original image data as input data. To be specific, if the purpose of the model is image quality enhancement, then the training unit 910 may generate, train, or update a model for generating a filter for downscaling or upscaling original image data and image data obtained by downscaling and upscaling original image data.

The acquisition unit 920 may obtain various information by using predetermined data as input data of a trained model.

For example, the acquisition unit 920 may obtain (or recognize, estimate, and infer) information associated with an input image using the input image and the trained filter when an image is input.

At least part of the training unit 910 and at least part of the acquisition unit 920 may be embodied as a software module and manufactured in the form of one or a plurality of hardware chips to be mounted on the electronic apparatus 100. For example, at least one of the training unit 910 and the acquisition unit 920 may be manufactured in the form of a hardware chip for AI specific operation, or manufactured as a part of an existing general processor (e.g. a CPU or an application processor) or a graphic processor (e.g., a GPU) to be mounted on the electronic apparatuses in a variety of types. The hardware chip for AI specific operation may be a processor specialized for probability computation having a higher parallel processing performance than a conventional general processor, thereby quickly performing an arithmetic operation in the AI field such as machine learning. When the training unit 910 and the acquisition unit 920 are implemented as a software module (or a program module including an instruction), the software module may be a non-transitory computer readable medium. In this case, the software module may be provided by an operating system (OS) or by a predetermined application. Alternatively, some of the software modules may be provided by an OS, and some of the software modules may be provided by a predetermined application.

The training unit 910 and the acquisition unit 920 may be mounted on a single electronic apparatus such as a server, or each may be mounted on separate electronic apparatuses. For example, one of the training unit 910 and the acquisition unit 920 may be included in an electronic apparatus such as a TV, and the other one may be included in an external server. The training unit 910 and the acquisition unit 920 may provide model information established by the training unit 910 to the acquisition unit 920 in a wired or wireless manner, or data input into the training unit 910 may be provided to the training unit 910 as additional training data.

Figure 10:
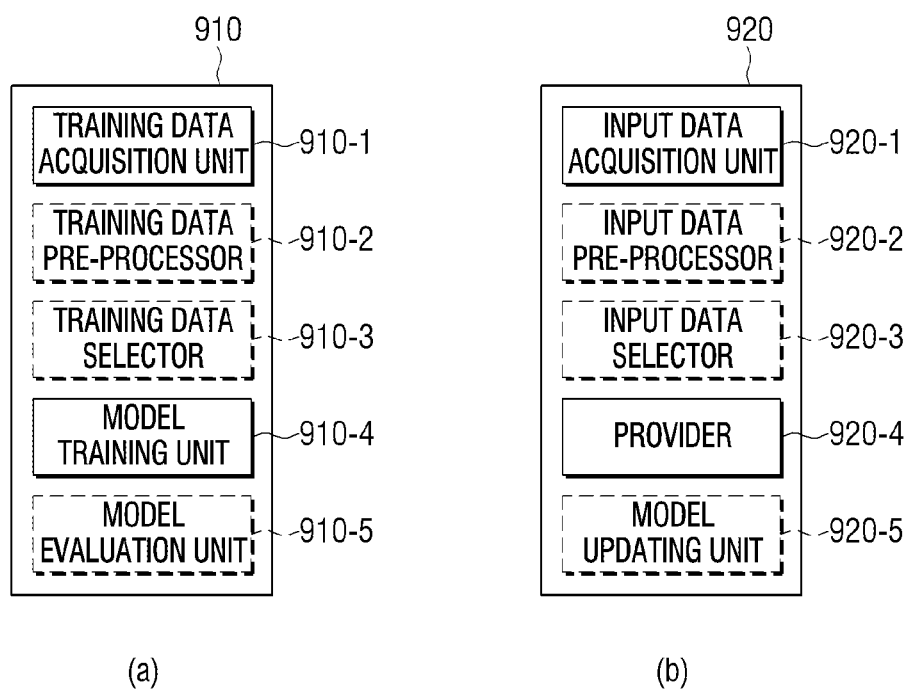
FIG. 10 is a block diagram of a training unit and an acquisition unit according to an embodiment.

FIG. 10 is a block diagram of a training unit and an acquisition unit according to an embodiment.

Referring to FIG. 10(*a*), the training unit 910 according to an embodiment may include a training data acquisition unit 910-1 and a model training unit 910-4. The training unit 910 may optionally further include a training data pre-processor 910-2, a training data selector 910-3, and a model evaluation unit 910-5.

The training data acquisition unit 910-1 may obtain training data for a model. According to an embodiment, the training data acquisition unit 910-1 may obtain data associated with an input image as training data. To be specific, the training data acquisition unit 910-1 may obtain downscaled original image data and original image data which are input images, and then obtain upscaled image data as training data.

The model training unit 910-4 may train how to modify the difference between the image processing result obtained by using training data and information associated with an actual input image. For example, the model training unit 910-4 may train an AI model through supervised learning that uses at least part of training data as criteria. The model training unit 910-4 may train an AI model through unsupervised learning by training itself using training data without any guidance. The model training unit 910-4 may train the AI model through reinforcement learning using feedback as to whether the result of the determination based on the training is correct. The model training unit 910-4 may also train the AI model using, for example, a learning algorithm including an error back-propagation method or a gradient descent.

When an AI model is trained, the model training unit 910-4 may store the trained AI model. In this case, the model training unit 910-4 may store the trained AI model in a server (e.g., an artificial intelligence server). The model training unit 910-4 may store the trained AI model in a memory of an electronic apparatus connected via a wired or wireless network.

The training data pre-processor 910-2 may pre-process the obtained data so that the obtained data may be used for training for the generating of the filter to be applied to a plurality of feature maps. The training data pre-processor 910-2 may format the obtained data in a predetermined format so that the model training unit 910-4 may use the obtained data for training for the generation of the filter to be applied to the feature map.

The training data selector 910-3 may select data for training between data obtained from the training data acquisition unit 910-1 or data pre-processed by the training data pre-processor 910-2. The selected training data may be provided to the model training unit 910-4. According to predetermined selection criteria, the training data selector 910-3 may select training data for training among obtained or pre-processed data. The training data selector 910-3 may select training data according to predetermined criteria by the training of the model training unit 910-4.

The training unit 910 may further include the model evaluation unit 910-5 for improving the recognition result of the AI model.

The model evaluation unit 910-5 may input evaluation data into an AI model, and if a recognition result output from evaluation data fails to meet predetermined criteria, allow the model training unit 910-4 to train. In this case, evaluation data may be pre-defined data for evaluating an AI model.

For example, if the number or ratio of evaluation data with an incorrect recognition result exceeds a predetermined threshold value, among recognition results of an AI model trained with respect to evaluation data, the model evaluation unit 910-5 may evaluate that the recognition result fails to satisfy predetermined criteria.

When there exist a plurality of trained AI models, the model evaluation unit 910-5 may evaluate whether each trained AI model satisfies predetermined criteria, and identify an AI model that satisfies predetermined criteria as a final AI model. In this case, when multiple AI models satisfy the predetermined criteria, the model evaluation unit 910-5 may identify a predetermined any one or a number of models set in advance in descending order of evaluation scores as a final AI model.

Referring to FIG. 10(*b*), an acquisition unit 920 may include an input data acquisition unit 920-1 and a provider 920-4.

The acquisition unit 920 may selectively further include an input data pre-processor 920-2, an input data selector 920-3, and a model updating unit 920-5.

The input data acquisition unit 920-1 may obtain input original image data, and obtain a plurality of filters according to the purpose of image processing. The plurality of filters may be a plurality of filters for downscaling image data and a plurality of filters for upscaling downscaled image data. The provider 920-4 may obtain a result of processing an input image by applying input data obtained from the input data acquisition unit 920-1 to the trained AI model as an input value. The provider 920-4 may obtain a result of processing an input image by applying data selected by the input data pre-processor 920-2 or the input data selector 920-3 to an AI model as an input value.

For example, the provider 920-4 may obtain (or estimate) a result of processing an input image by applying input original image data obtained from the input data acquisition unit 920-1, a filter for downscaling original image data, and a filter for upscaling downscaled image data to a trained AI model.

The acquisition unit 920 may further include the input data pre-processor 920-2 and the input data selector 920-3 for improving a recognition result of an AI model, or saving resources or time for providing a recognition result.

The input data pre-processor 920-2 may pre-process the obtained data so that the data obtained to be input into first and second AI models may be used. The input data pre-processor 920-2 may format obtained data in a pre-defined format so that the provider 920-4 may use the obtained data for obtaining an improved compression rate.

The input data selector 920-3 may select data for state determination between data obtained from the input data acquisition unit 920-1 and data pre-processed by the input data pre-processor 920-2. The selected data may be provided to the provider 920-4. The input data selector 920-3 may select a part or all of obtained or pre-processed data according to predetermined criteria for state determination. The input data selector 920-3 may select data according to predetermined criteria by the training of the model training unit 910-4.

The model updating unit 920-5 may control an AI model to be updated based on the evaluation of the recognition result provided by the provider 920-4. For example, the model updating unit 920-5 may provide the image processing result provided by the provider 920-4 to the model training unit 910-4 to request the model training unit 910-4 to additionally train or update an AI model.

FIG. 11 is a diagram of a training method of a filter set according to an embodiment.

According to an embodiment, a CNN-based model may include three-dimensional convolutional filters of width× height×channel, and a layer of an active function.

A parameter of a convolutional filter may be an object for training and an improved parameter suitable for a purpose may be obtained through training. An AI downscaling model and an AI upscaling model are aimed at providing an improved compression rate so that image data obtained by downscaling and upscaling original image data is to the most similar to the original image data.

The training may be performed by a server or an electronic apparatus, and for ease of explanation, it will be described that a server performs the training.

Referring to FIG. 11, according to a training method of the disclosure, the server may obtain compressed image data 1130 by downscaling original image data 1110 using X convolution filters 1120. FIG. 11 illustrates that original image data that is sized 2N×2M is downscaled to compressed image data that is sized N×M, but the disclosure is not limited thereto.

The server may obtain restoration image data 1150 by upscaling the obtained compressed image data 1130 using Y convention filters 1140. The number "Y" could be smaller than the number "X".

The server may compare the restoration image data 1150 with the original image data 1110 and train a parameter of each of filters 1120 and 1140 to reduce loss. The server may calculate a loss value using a similarity analysis method (e.g., PSNR, SSIM, etc.).

The AI downscaling model and an AI upscaling model to which a trained parameter is applied may compress or restore image data through an improved scaling operation.

Figure 12:
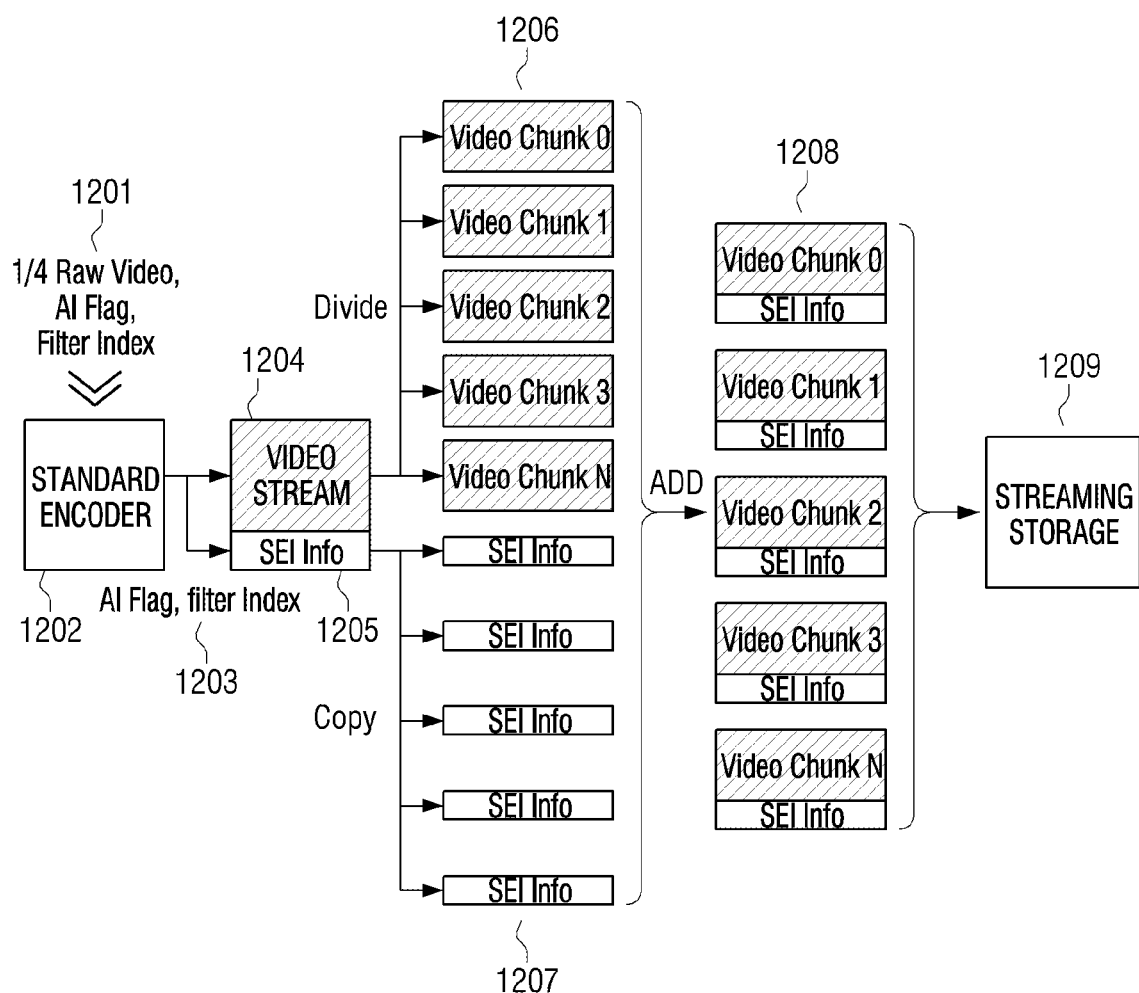
FIG. 12 is a diagram of a structure of streaming data according to an embodiment.

FIG. 12 is a diagram of a structure of streaming data according to an embodiment. FIG. 12 illustrates a detailed example embodiment in which information associated with the filter set is stored during the encoding operation 24 of FIG. 2.

Referring to FIG. 12, raw video data downscaled by ¼, an AI flag, and filter index information 1201 may be input into a standard encoder 1202. The server may obtain a video stream 1204 by encoding input raw video data downscaled by ¼. The video stream may refer to a video bit stream.

The server may include the input AI flag and the filter index information 1203 in SEI information 1205 included in the video stream 1204. The server may divide the video stream 1204 into N video chunks 1206, and copy the SEI information 1205 to generate N SEI information 1207.

The server may add the generated SEI information to each video chunk, and store a plurality of video chunks 1208 to which SEI information is individually added in a streaming storage 1209.

Although not shown, the plurality of stored video chunks 1208 may be transmitted to the electronic apparatus.

Figure 13:
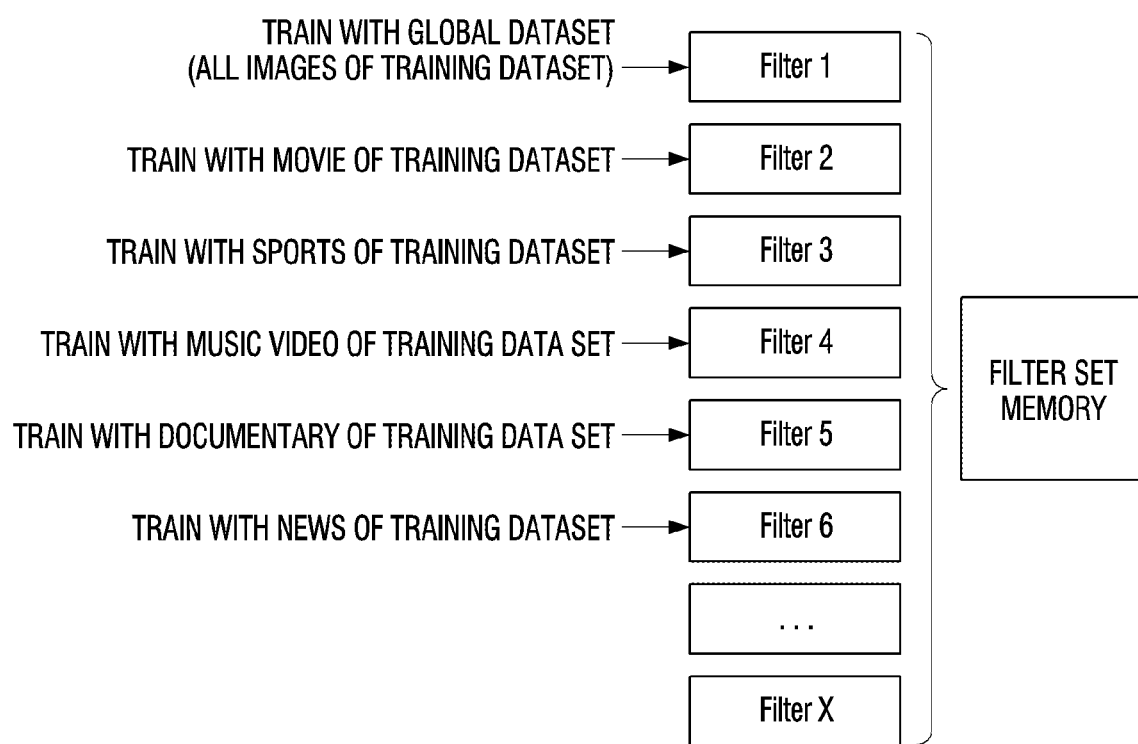
FIG. 13 is a diagram of a training method of a filter set according to an embodiment.

FIG. 13 is a diagram of a training method of a filter set according to an embodiment.

Referring to FIG. 13, each of a plurality of filter sets may be trained with image data of a different genre. To be specific, a first filter set (filter 1) may be trained with all images of a training data set for training (a global data set).

In addition, each filter set may be trained with image data of a single genre such as film, sports, music videos, documentaries, news, etc. of a training data set.

As described above, when each filter set completes training based on the genre of image data, a filter set may be selected based on the genre of the input original image data.

However, the disclosure is not limited thereto. An improved filter set may be selected after applying a plurality of filter sets regardless of the genre of the input original image data.

FIG. 13 describes training each filter set using a training data set classified based on the genre of image data. However, the disclosure is not limited thereto, and the training data set may be classified according to various criteria.

Figure 14:
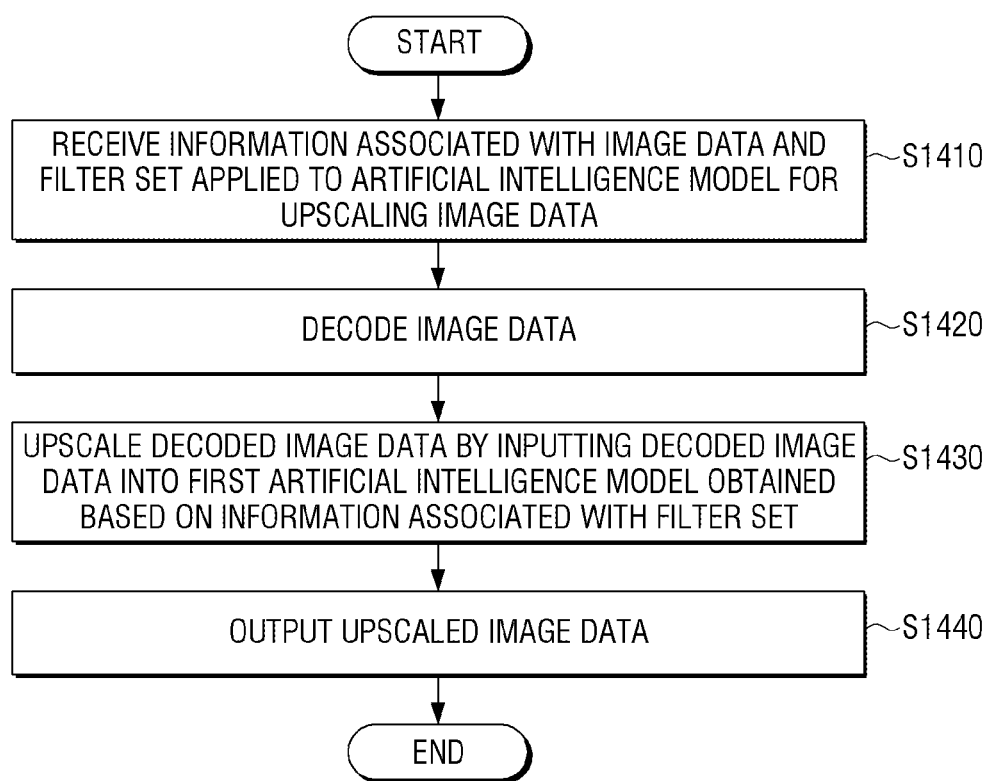
FIG. 14 is a flowchart of an image decoding operation of an electronic apparatus according to an embodiment.

FIG. 14 is a flowchart of an image decoding operation of an electronic apparatus according to an embodiment.

Referring to FIG. 14, an electronic apparatus may receive information associated with image data and a filter set applied to an artificial intelligence model for upscaling image data at operation S1410. The information associated with the filter set may be included with the image data. The electronic apparatus may receive information associated with the image data and the filter set from an external server.

The electronic apparatus may decode the received image data at operation S1420. The received image data may be image data encoded by a server, and the encoded image data may be obtained by encoding the downscaled original image data.

The electronic apparatus may upscale decoded image data by inputting decoded image data into the first artificial intelligence model obtained based on the information associated with the filter set at operation S1430. A plurality of filter sets may be pre-stored in the electronic apparatus. The electronic apparatus may obtain the first intelligence model for upscaling image data by using a filter set corresponding to the received information from among a plurality of filter sets. The electronic apparatus may upscale the decoded image data using the obtained first AI model.

When a plurality of filter sets are not stored in an electronic apparatus, the electronic apparatus may transmit the received information associated with the filter set to a second external server. The second external server may store parameter information associated with a plurality of filter sets. The second external server may be the same as or different from an external server that transmits image data to an electronic apparatus.

When receiving parameter information of the filter set corresponding to the transmitted information from the second external server, the electronic apparatus may obtain the first AI model by applying the received parameter information.

The electronic apparatus may output the upscaled image data at operation S1440. To be specific, if the electronic apparatus is a display device with a display, the electronic apparatus may control the display to display the upscaled image data. If the electronic apparatus is an apparatus without a display, then the electronic apparatus may transmit the upscaled image data to the external display device to be displayed. In other words, the electronic apparatus may provide the upscaled image data for output via a display of the electronic apparatus, or to an external display device for output via a display of the external display device.

As described above, an electronic apparatus according to an embodiment may receive information associated with encoded image data and an improved filter set from an external server, thereby reducing time and resources consumed in the restoration of the image data. Therefore, a high compression rate of an image can be realized, and a high-definition image can be compressed and transmitted to image data of a smaller size.

Figure 15:
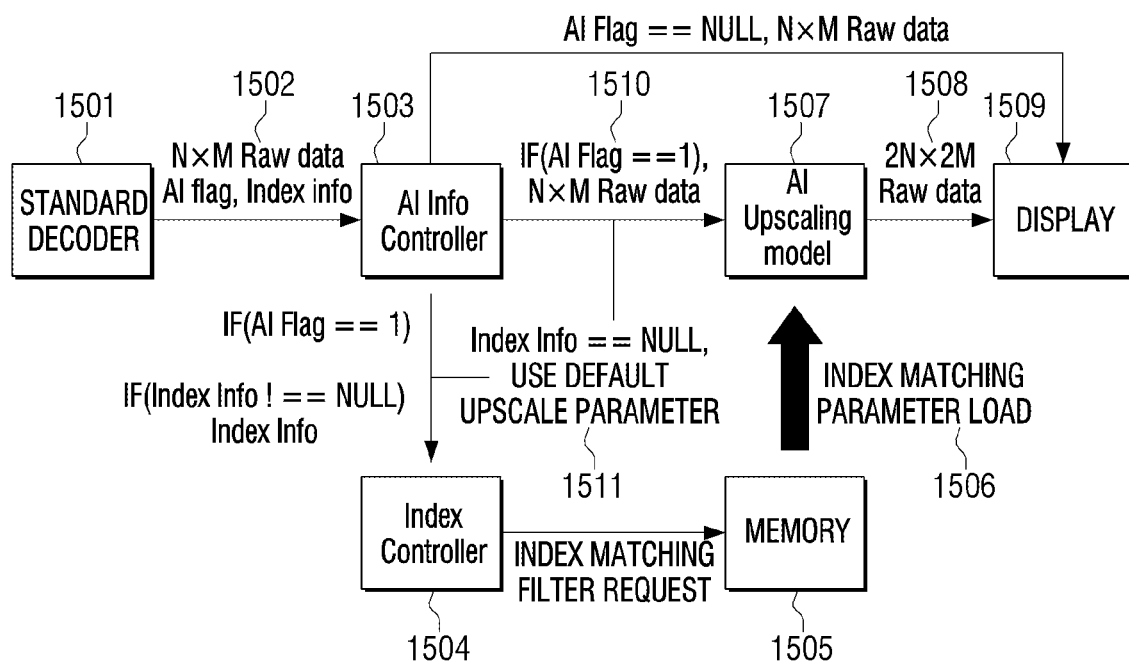
FIGS. 15 and 16 are diagrams of an image decoding operation of an electronic apparatus according to an embodiment.
Figure 16:
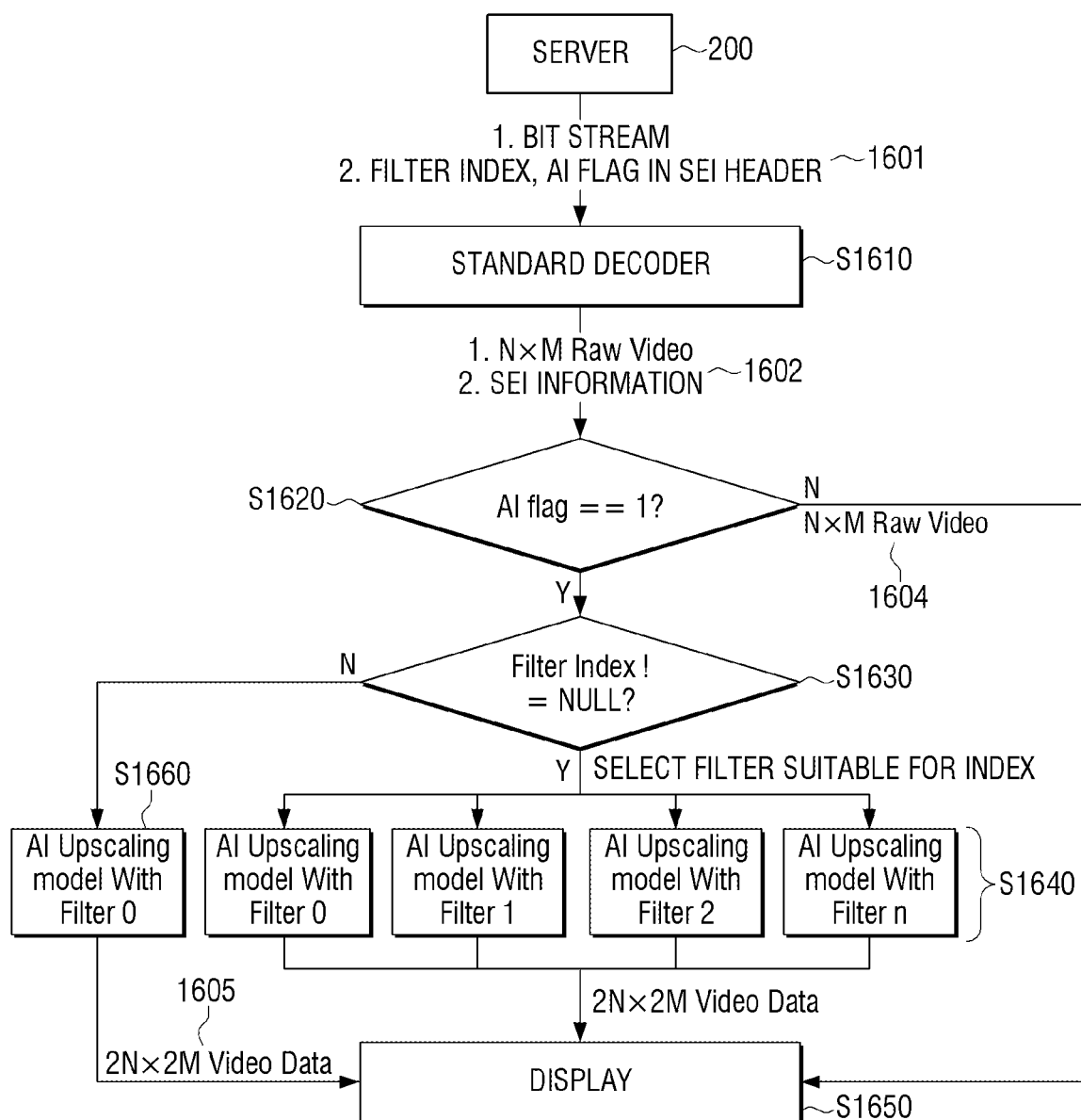

FIGS. 15 and 16 are diagrams of an image decoding operation of an electronic apparatus according to an embodiment.

FIG. 15 describes a configuration of an apparatus for realizing an AI decoding operation. Operation 1501 of FIG. 15 may correspond to operation 26 of FIG. 2, and operations 1503, 1504, 1505 and 1509 of FIG. 15 may correspond to operation 28 of FIG. 12.

Referring to FIG. 15, the electronic apparatus may obtain compressed raw data, an AI flag, and filter index information 1502 by decoding the encoded image using a standard decoder 1501. The electronic apparatus may transmit the obtained raw data and information to an AI information controller 1503, and determine whether AI encoding is performed, and whether there is index information.

If the AI flag indicates that AI encoding is not performed (e.g., AI Flag==NULL), then the raw data may be transmitted to a display 1509 to display raw data that is sized N×M without performing an upscaling process.

If the AI flag indicates that AI encoding was performed (e.g., AI Flag==1), then the AI information controller 1503 may transmit raw data 1510 that is sized N×M to an artificial intelligence (AI) upscaling model 1507.

If the index information indicates that AI encoding and the multi-AI filter options are used (e.g., Index info!=NULL), then the AI information controller 1503 may transmit index information to an index controller 1504. The index controller 1504 that receives the index information may transmit a request 1511 to the memory 1505 to load a parameter of a filter matched index information to the AI upscaling model 1507. When the loading 1506 of the parameter matched with the index information is completed, the AI upscaling model 1507 may obtain raw data having a size of 2N×2M 1508 by upscaling the transmitted raw data that is sized N×M 1510 using the parameter matched with the loaded index information.

If the index information indicates that AI encoding and the multi-AI filter options are not used (e.g., Index info==NULL), then the AI upscaling model 1507 may obtain the raw data that is sized 2N×2M 1508 by upscaling the raw data having the size of N×M 1510 using a default upscaling parameter.

The electronic apparatus may transmit the obtained raw data that is sized 2N×2M 1508 to the display 1509 to be displayed.

For ease of explanation, FIG. 15 illustrates that the standard decoder 1501, the AI information controller 1503, the index controller 1504, and the AI upscaling model 1507 are separate components, but in other embodiments, the operation of each apparatus may be performed by one or more processors.

FIG. 16 describes an AI decoding operation in detail. Operation S1601 of FIG. 16 may correspond to operation 26 of FIG. 2, and operations S1620 to S1640 of FIG. 16 may correspond to operation 28 of FIG. 2.

Referring to FIG. 16, an electronic apparatus may receive a bit stream, a filter index included in an SEI header, and an AI flag 1601 from a server 200. The electronic apparatus may obtain raw video data that is sized N×M and SEI information 1602 by decoding the received bit stream input into the standard decoder in operation S1610, the filter index included in the SEI header, and the AI flag 1601.

The electronic apparatus may determine whether the AI flag stored in the SEI information indicates that AI encoding was performed (e.g., AI Flag==1) at operation S1620. If the electronic apparatus determines that AI encoding was not performed at operation S1620 (e.g., S1620—N), then the electronic apparatus may display raw video data that is sized N×M at operation S1650.

If the electronic apparatus determines that AI encoding was performed at operation S1620 (e.g., S1620—Y), then the electronic apparatus may determine whether the multi-AI filter option was used (e.g., whether filter index!=NULL) at operation S1630. If the electronic apparatus determines that the multi-AI filter option is used at operation S1630 (e.g., S1630—Y), then the electronic apparatus may select a filter set corresponding to the filter index information. The electronic apparatus may upscale raw video data that is sized N×M using the AI upscaling model obtained by applying the selected filter set at operation S1640. The electronic apparatus may display the upscaled video data of size 2N×2M at operation S1650.

For ease of explanation, FIG. 16 illustrates that n filter sets of which indices are 0, 1, 2, and 3 are pre-stored in an electronic apparatus, but the number of index information and filter sets is not limited thereto.

If the electronic apparatus determines that the multi-AI filter option is not used at operation S1630 (e.g., S1630—N), then the electronic apparatus may perform AI upscaling to which filter set 0 is applied at operation S1660. The filter set 0 may be a default filter set. The electronic apparatus may display upscaled video data that is sized 2N×2M at operation S1650.

As described above, an electronic apparatus according to an embodiment may receive information associated with encoded image data and an improved filter set from an external server, thereby reducing time and resources consumed in the restoration of the image data. Therefore, a high compression rate of an image can be realized, and a high-definition image can be compressed to image data of a smaller size and transmitted in a streaming environment.

FIG. 17 is a diagram of an image upscaling operation of an electronic apparatus according to an embodiment. The electronic apparatus may receive input image data 1705 and filter index information 1701 from a server.

The electronic apparatus may select 1703 a filter set matched with filter index information 1701 among a plurality of filter sets stored in a memory 1702. The plurality of filter sets stored in the memory 1702 may be a collection of filters trained using different training data. Each filter set may be a filter set applied to a CNN model. Each filter set may include a plurality of layers and a plurality of parameters applied to a bias 1704. Each of the plurality of layers may include a plurality of filters.

The electronic apparatus may obtain an upscaling AI model by applying each parameter of the selected filter set. Referring to FIG. 17, an upscaling AI model including y convolution filters 1706 may be obtained, and the number of convolution filters may vary depending on the selected filter set. The electronic apparatus may obtain the restored output image 1707 by inputting the input image data 1705 into the obtained AI upscaling model. The restored output image 1707 may be obtained by upscaling the input image data 1705.

The reason for providing a plurality of filters sets are as follows.

First, a CNN model may contain the characteristic of a black-box. Due to the characteristic of a black box, it may be difficult to identify the operation of the CNN model in the apparatus during a training process. Therefore, a training data set might be needed to be input differently in order to obtain a filter set specialized or optimized for image components such as the image genre. The specialized filter set obtained by the input data of a specific image component may have high loss and low upscaling function on average as compared to a filter set trained with an entire data set, but in a specific image, an improved result could be derived.

Second, there is a limitation on deeply forming a filter layer of an AI upscaling model of a decoder portion due to the real time nature of the decoder portion. The convolution calculation requires a large amount of computing/hardware resources, and thus the CNN model may hinder the real time performance. Accordingly, if applying various trained upscaling filter sets to the encoder portion, the width of the layer may be increased, and thus the upscaling function may be enhanced.

Last, the multi-filtering may provide an improved compression rate in a plurality of stored filter sets. By way of performing upscaling using all of the plurality of filter sets without additional image analysis based on the non-real time nature of image streaming encoding, an improved filter set may be selected to provide an improved result.

According to above-described various embodiments, by way of identifying an improved upscaling filter set through a plurality of upscaling processes in advance in an encoding process by a server, a restoration process in an electronic apparatus can be simplified. Therefore, a high compression rate may be provided in an image streaming environment, and thus a high definition image can be transmitted.

Meanwhile, the various embodiments described above can be implemented using software, hardware, or a combination thereof. According to a hardware implementation, the embodiments described in this disclosure may be implemented as application specific integrated circuits (ASICs), digital signal processors (DSPs), digital signal processing devices (DSPDs), programmable logic devices (PLDs), programmable gate arrays, a processor, a controller, a micro-controller, a microprocessor, and an electrical unit for performing other functions. According to software implementation, embodiments such as the procedures and functions described herein may be implemented in separate software modules. Each of the software modules may perform one or more of the functions and operations described herein.

Meanwhile, the methods according to various embodiments of the disclosure described above may be stored in a non-transitory computer readable medium. Such non-transitory computer readable media can be used in various devices.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

According to an embodiment, the methods according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., PlayStore™). In the case of on-line distribution, at least a portion of the computer program product may be temporarily stored, or temporarily created, on a storage medium such as a manufacturer's server, a server of an application store, or a memory of a relay server.

Although embodiments have been shown and described, it will be appreciated by those skilled in the art that changes may be made to these embodiments without departing from the principles and spirit of the disclosure. Accordingly, the scope of the present disclosure is not construed as being limited to the described embodiments, but is defined by the appended claims as well as equivalents thereto.

What is claimed is:

1. A server comprising:
a memory; and
a processor configured to:
obtain downscaled image data by downscaling original image data;
determine whether a multi-artificial intelligence (AI) filter option is used;
based on the multi-AI filter option being used, obtain a plurality of upscaled image data by respectively inputting the downscaled image data into a plurality of artificial intelligence (AI) upscaling models including a plurality of filter sets respectively stored in the memory, select a filter index of an AI upscaling model among the plurality of AI models, and encode the downscaled image data based on an AI flag and the selected filter index of the AI upscaling model; and
based on the multi-AI filter option not being used, encode the downscaled image data based on a value indicating that no filter index is used, the AI flag indicating whether AI downscaling is performed, and the AI upscaling model outputting upscaled image data having a minimum difference from the original image data among the plurality of upscaled image data.

2. The server of claim 1, further comprising:
a communication interface comprising communication circuitry,
wherein the processor is further configured to control the communication interface to transmit the encoded image data to an electronic apparatus.

3. The server of claim 1, wherein the processor is further configured to obtain the downscaled image data by inputting the original image data into an AI downscaling model for downscaling image data.

4. The server of claim 3, wherein a number of filters of the AI upscaling model is smaller than a number of filters of the AI downscaling model.

5. The server of claim 1, wherein parameters of the plurality of filter sets are trained to reduce a difference between the plurality of upscaled image data and the original image data.

6. The server of claim 1, wherein the plurality of AI upscaling models are a Convolutional Neural Network (CNN).

7. A method for controlling a server, the method comprising:
obtaining downscaled image data by downscaling original image data;
determining whether a multi-artificial intelligence (AI) filter option is used;
based on the multi-AI filter option being used, obtaining a plurality of upscaled image data by respectively inputting the downscaled image data into a plurality of artificial intelligence (AI) upscaling models including a plurality of filter sets respectively, selecting a filter index of an AI upscaling model among the plurality of AI models, and encoding the downscaled image data based on an AI flag and the selected filter index of the AI upscaling model; and
based on the multi-AI filter option not being used, encoding the downscaled image data based on a value indicating that no filter index is used, the AI flag indicating whether AI downscaling is performed, and the AI upscaling model outputting upscaled image data having a minimum difference from the original image data among the plurality of upscaled image data.

8. The method of claim 7, further comprising:
transmitting the encoded image data to an electronic apparatus.

9. The method of claim 7, wherein the obtaining the downscaled image data comprises obtaining the downscaled image data by inputting the original image data into an AI downscaling model for downscaling image data.

10. The method of claim 9, wherein a number of filters of the AI upscaling model is smaller than a number of filters of the AI downscaling model.

11. The method of claim 7, wherein parameters of the plurality of filter sets are trained to reduce a difference between the plurality of upscaled image data and the original image data.

12. The method of claim 7, wherein the plurality of AI upscaling models are a Convolutional Neural Network (CNN).

* * * * *